United States Patent
Kishore et al.

(10) Patent No.: US 12,001,228 B2
(45) Date of Patent: Jun. 4, 2024

(54) THERMAL DIODE AND THERMAL SWITCH FOR BI-DIRECTIONAL HEAT TRANSFER IN BUILDING ENVELOPES

(71) Applicant: Alliance for Sustainable Energy, LLC, Golden, CO (US)

(72) Inventors: Ravi Anant Kishore, Lakewood, CO (US); Sampath Kommandur, Golden, CO (US); Charles William Booten, Arvada, CO (US); Lance Michael Wheeler, Wheat Ridge, CO (US); Shuang Cui, Dallas, TX (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 7 days.

(21) Appl. No.: 17/715,144

(22) Filed: Apr. 7, 2022

(65) Prior Publication Data
US 2022/0326722 A1    Oct. 13, 2022

Related U.S. Application Data

(60) Provisional application No. 63/236,779, filed on Aug. 25, 2021, provisional application No. 63/171,626, filed on Apr. 7, 2021.

(51) Int. Cl.
*G05D 23/12* (2006.01)
*H01H 37/44* (2006.01)

(52) U.S. Cl.
CPC ........... *G05D 23/121* (2013.01); *H01H 37/44* (2013.01)

(58) Field of Classification Search
CPC .............. G05D 23/121; H01H 37/44
USPC ......................................................... 337/298
See application file for complete search history.

(56) References Cited

U.S. PATENT DOCUMENTS

| | | | |
|---|---|---|---|
| 5,379,601 A * | 1/1995 | Gillett | G05D 23/01 62/298 |
| 6,059,016 A | 5/2000 | Rafalovich et al. | |
| 7,154,369 B2 * | 12/2006 | Dietz | F25D 19/006 62/383 |

(Continued)

FOREIGN PATENT DOCUMENTS

CN    109385685 A    2/2019

OTHER PUBLICATIONS

"Heat Pipe Material Compatibility—Fluid/Envelope/Wick", NCT Advanced Coolong Technologies, available at https://www.1-act.com/resources/heat-pipe-resources/materials/compatibility/, accessed Jul. 19, 2022, pp. 1-13.

(Continued)

*Primary Examiner* — Anatoly Vortman
(74) *Attorney, Agent, or Firm* — Alexandra M. Hall

(57) ABSTRACT

The present disclosure relates to a directional heat transfer using thermal control devices, including a dual phase change thermal diode and an active contact-based thermal switch. The thermal diode includes a positive temperature coefficient switching material and a negative temperature coefficient switching material arranged in series. The thermal switch includes two thermally conducting surfaces which may be moved to contact (i.e., having a distance between them of substantially zero) creating minimal thermal contact resistance. Both thermal control devices may be used to control heat flow into and/or out of a building.

9 Claims, 11 Drawing Sheets

(56) References Cited

U.S. PATENT DOCUMENTS

| | | | | |
|---|---|---|---|---|
| 7,752,866 | B2* | 7/2010 | Vaidyanathan | B64G 1/50 337/393 |
| 7,755,899 | B2* | 7/2010 | Stenmark | H01H 37/36 337/393 |
| 8,339,787 | B2* | 12/2012 | Tsai | G06F 1/206 165/185 |
| 8,716,689 | B2 | 5/2014 | Chen et al. | |
| 9,025,333 | B1* | 5/2015 | Spowart | B64G 1/50 62/383 |
| 11,112,190 | B2 | 9/2021 | Villette et al. | |
| 2010/0221627 | A1 | 9/2010 | Nakakubo | |
| 2011/0259872 | A1* | 10/2011 | Wang | H05B 3/56 219/490 |
| 2012/0012804 | A1* | 1/2012 | Chen | H01L 23/427 165/104.21 |
| 2014/0345843 | A1* | 11/2014 | Kirkor | C09K 5/14 165/185 |
| 2016/0123637 | A1 | 5/2016 | Moreno et al. | |
| 2016/0161155 | A1* | 6/2016 | Guichard | F25D 16/00 62/324.2 |
| 2017/0271726 | A1 | 9/2017 | Shen et al. | |
| 2018/0202726 | A1 | 7/2018 | Tso et al. | |
| 2020/0136210 | A1* | 4/2020 | Bruce | B60L 1/02 |
| 2020/0363108 | A1 | 11/2020 | Novek | |

OTHER PUBLICATIONS

Cottrill et al., "Dual phase change thermal diodes for enhanced rectification ratios: theory and experiment", Advanced Energy Materials, 2018, vol. 8, No. 1702692, pp. 1-11.

Es et al., "Benefits and Drawbacks of Using Two-Phase Cooling Technologies in Military Platforms", Nationaal Lucht-en Ruimtevaartlaboratorium—National Aerospace Laboratory NLR, Report No. NLR-TP-2011-085, Feb. 2011, pp. 1-12.

Fang et al., "Heating performance investigation of a bidirectional partition fluid thermal diode", Renewable Energy, Mar. 2010, vol. 35, No. 3, pp. 679-684.

Jones, "Heat transfer in a liquid convective diode", Journal of Solar Energy Engineering, Aug. 1986, vol. 108, No. 3, pp. 163-171.

Kommandur et al., "Dual Phase Change Thermal Diodes with High Rectification for Thermal Management near Room Temperature", Advanced Materials Technologies, 2022, vol. 7, No. 2101060, pp. 1-8.

Ochi et al., "Development of a heat-pipe thermal diode and its heat transport performance", JSME International Journal Series B Fluids and Thermal Engineering, 1996, vol. 39, No. 2, pp. 419-425.

Shao et al., "Recent progress in the phase-transition mechanism and modulation of vanadium dioxide materials", NPG Asia Materials, 2018, vol. 10, pp. 581-605.

Shrestha et al., "Dual-mode solid-state thermal rectification", Nature Communications, 2020, vol. 11, No. 4346, pp. 1-7.

Srimuang et al., "A review of the applications of heat pipe heat exchangers for heat recovery", Renewable and Sustainable Energy Reviews, Aug. 2012, vol. 16, No. 6, pp. 4303-4315.

Susheela et al., "Heat pipe augmented passive solar system for heating of buildings", Journal of Energy Engineering, 2001, vol. 127, No. 1, pp. 18-36.

Varga et al., "Characterisation of thermal diode panels for use in the cooling season in buildings", Energy and Buildings, Mar. 2002, vol. 34, No. 3, pp. 227-235.

Yau et al., "A review on the application of horizontal heat pipe heat exchangers in air conditioning systems in the tropics", Applied Thermal Engineering, Feb. 2010, vol. 30, Nos. 2-3, pp. 77-84.

Zhang et al., "Evaluating the use heat pipe for dedicated ventilation of office buildings in Hong Kong", Energy Conversion and Management, Apr. 2011, vol. 52, No. 4, pp. 1983-1989.

Zhu et al., "Temperature-gated thermal rectifier for active heat flow control", Nano Letters, 2014, vol. 14, No. 8, pp. 4867-4872.

International Search Report and Written Opinion for International (PCT) Application No. PCT/US22/23766, dated Aug. 24, 2022, pp. 1-9.

* cited by examiner

A)

B)

A)

B)

A)

B)

THERMAL DIODE AND THERMAL SWITCH FOR BI-DIRECTIONAL HEAT TRANSFER IN BUILDING ENVELOPES

CROSS-REFERENCE TO RELATED APPLICATIONS

This application claims priority to U.S. Provisional Patent Application No. 63/171,626 filed on Apr. 7, 2021, and U.S. Provisional Patent Application No. 63/236,779 filed on Aug. 25, 2021, the contents of which are incorporated herein by reference in their entirety.

CONTRACTUAL ORIGIN

This invention was made with United States government support under Contract No. DE-AC36-08GO28308 awarded by the U.S. Department of Energy. The United States government has certain rights in this invention.

BACKGROUND

Heating, ventilation, and air conditioning (HVAC) currently accounts for nearly 40% of the total energy consumed in buildings. Controlling heat flow is a critical challenge in buildings, as heat/cooling loss or passive heating/cooling, are large energy sinks. In an attempt to minimize heat/cooling loss and/or passive heating/cooling, directional heat transfer and thermal managements systems, such as thermosiphons, heat pipes, and other two-phase heat transport systems, where a working liquid in contact with the heat source turns into vapor by absorbing heat and vapor then travels and condenses back into liquid towards the heat sink have been used. Though thermosiphons and heat pipes have been extensively explored for last several decades for numerous applications such as heat recovery, solar water heating, and space heating and cooling, their functional dependence on gravity limits their operations as they need to be installed vertically. Other problems associated with these systems are related to incompatible fluid-envelope pairs resulting in non-condensable gas, corrosion, and materials transport that degrade their performance. Lastly, in most cases, a portion of the existing building envelope needs to be demolished to install the heat pipes, making them more suitable and economical for installation in new construction than in existing buildings.

Thermal control devices can be used in building envelopes. This could potentially bring down the associated costs. A key challenge to widespread use of thermal control devices in large-scale applications is the scalability. Several thermal control devices have been demonstrated with very good performance but are not readily amenable to scaling either due to the cost of associated materials, modes of contributing heat transfer, or the design. Thermal regulators/switches are usually characterized by means of rectification ratio, which is the ratio of conductance in the ON state to OFF state. Rectification values ranging from ~1 to >100 have been successfully demonstrated across different length scales (nanometer to meter scale). The regulators with the highest rectification values here use contact-based switching (i.e., no contact in OFF state and contact in ON state) using shape memory alloys (SMA). Thus, there remains a need for thermal switches and/or thermal regulators for use in building envelopes that can efficiently control heat loss or gain to the building (i.e., efficient directional heat transfer and thermal managements systems for building applications).

SUMMARY

An aspect of the present disclosure is a device for performing thermal management, the device including a positive temperature coefficient (PTC) switching material and a negative temperature coefficient (NTC) switching material, in which the PTC switching material and NTC switching material are arranged in series, the PTC switching material is in direct thermal contact with a heat source, the NTC switching material is in direct thermal contact with a heat sink, and when the heat source is at a first temperature the device is configured to allow heat to flow from the heat source to the heat sink. In some embodiments, the first temperature is in the range of about 30° C. to about 50° C. In some embodiments, the PTC switching material is poly (N-isopropylacrylamide) (PNIPAM). In some embodiments, the NTC switching material is calcium chloride hexahydrate ($CaCl_2 \cdot 6H_2O$). In some embodiments, the PTC switching material has a first transition temperature, and the NTC switching material has a second transition temperature. In some embodiments, the first transition temperature is between about 30° C. and about 40° C. In some embodiments, the first temperature is greater than or approximately equivalent to the first transition temperature. In some embodiments, at a second temperature the device is configured to not allow heat to flow from the heat source to the heat sink. In some embodiments, the second temperature is less than the first transition temperature. In some embodiments, the device has a thermal rectification of greater than about 2.0.

An aspect of the present disclosure is a device for performing thermal management, the device including a first conductor in direct thermal contact with a heat source, a second conductor in direct thermal contact with a heat sink, an insulator positioned between the first conductor and the second conductor and having a length, a connector extending greater than the length, and a piston configured to move the connector, in which the connector is configured to move between a first position and a second position, the first position includes the connector being in thermal contact with the first conductor, the second position includes the connector being in thermal contact with the first conductor and the second conductor, and at a first temperature the piston is configured to move the connector from the first position to the second position, and when in the second position the device is configured to allow heat to flow from the heat source to the heat sink. In some embodiments, the first temperature is in the range of about 30° C. to about 50° C. In some embodiments, at a second temperature the device is configured to move from the second position to the first position. In some embodiments, the second temperature is less than about 30° C. In some embodiments, the device also includes a motor configured to move the piston. In some embodiments, the motor includes a wax, the wax is configured to melt at approximately the first temperature, and the wax is configured to expand when melted, thereby moving the piston to the second position. In some embodiments, the wax comprises a paraffin wax. In some embodiments, the wax is configured to solidify at the second temperature, and the wax is configured to shrink when solid, thereby moving the piston to the first position. In some embodiments, the first conductor and the second conductor are concentrically aligned, the connector is concentrically aligned with the first conductor and the second conductor, and the connector is concentrically aligned with the insulator. In some embodiments, the connector is configured to slide inside at least a part of the first conductor, the second conductor, and the insulator.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

Figure 1:
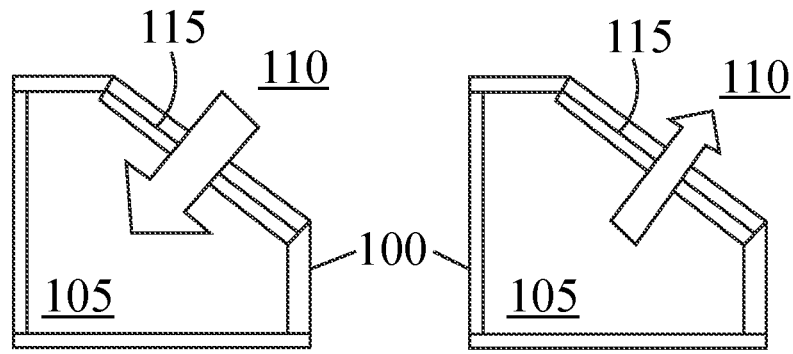
FIG. 1 illustrates the directional heat transfer enabled by thermal control devices, according to some aspects of the present disclosure.
Figure 1:
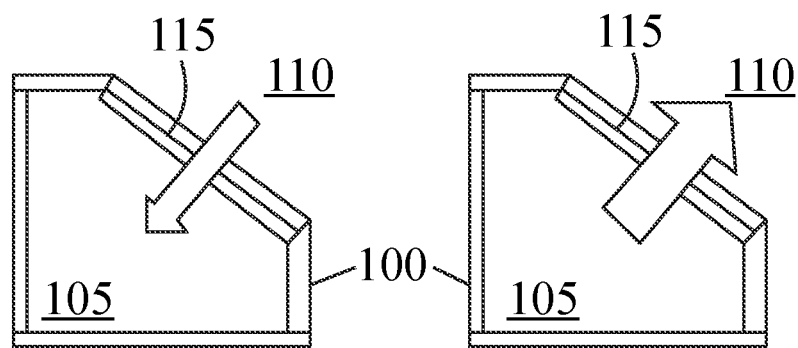

| REFERENCE NUMBERS | |
|---|---|
| 100 | building envelope |
| 105 | building interior |
| 110 | ambient |
| 115 | thermal control device |
| 120 | PTC |
| 125 | NTC |
| 130 | heat source |
| 135 | heat sink |
| 140 | dual phase change thermal diode |
| 200 | contact-based thermal switch |
| 205 | conductor |
| 210 | insulation |
| 215 | connector |
| 220 | piston |

| REFERENCE NUMBERS | |
|---|---|
| 225 | motor |
| 300 | system |
| 305 | phase change material |
| 310 | siding |
| 315 | wallboard |

DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to a directional heat transfer using at least one thermal control device. The thermal control devices include a dual phase change thermal diode and an active contact-based thermal switch. The thermal diode includes a positive temperature coefficient switching material and a negative temperature coefficient switching material arranged in series. The thermal switch includes two thermally conducting surfaces which may be moved to contact (i.e., having a distance between them of substantially zero) thereby having minimal thermal contact resistance. Both the dual phase change thermal diode and the thermal switch may be used to control heat flow into and/or out of a building, thereby reducing heating and cooling costs.

FIG. 1 illustrates the directional heat transfer enabled by the thermal control devices 115 (i.e., dual phase change thermal diode and contact-based thermal switch) as described herein. Panel A illustrates "heating season" (i.e., winter, or cooler months/days/times when buildings are heated) and panel B) illustrates "cooling season" (i.e., summer, or warmer months/days/times when buildings are cooled). The building envelope 100 contains the interior 105 of the building, separating the interior 105 of the building from the ambient 110. The thermal control devices 115 may be embedded in the building envelope 110 such that the thermal control devices 115 are in thermal contact (i.e., can exchange heat with) both the building interior 105 and the ambient 110. During the "heating season" (as shown in panel A) the thermal control devices 115 may enable heat to infiltrate the interior 105 from the ambient 110 and/or prevent heat from escaping the interior 105 to the ambient 110. During the "cooling season" (as shown in panel B) the thermal control devices 115 may enable heat to exit the interior 105 to the ambient and/or prevent heat from entering the interior 105 from the ambient 110.

Thermal control devices 115 may be used to reduce building energy use and costs and direct analogies can be drawn to their electrical counterparts. Thermal control devices 115 may modify the heat flow (Q) depending on the temperature of the system, magnitude and/or direction of temperature bias, or an external stimulus. Thermal control devices 115 modulate the heat flow rate (Q) depending on the direction of temperature bias ($\Delta T$), i.e., $|Q(\Delta T)| \neq |Q(-\Delta T)|$. Thermal control devices 115 are systems whose thermal conductance ($dQ/d(\Delta T)$) switches from a low (i.e., "OFF" state) to a high (i.e., "ON" state) value when the temperature reaches a critical value, which may be chosen based on the needs of the system. Thermal control devices 115 also exhibit a similar increase in conductance, but in response to an external, non-thermal stimulus. While thermal control devices 115 offer versatility, some offer the advantage of passive operation, as described herein.

One of the thermal control devices 115 as described herein is the dual phase change thermal diode. The dual phase change thermal diode includes a first phase change material (PCM) of a positive temperature coefficient switching material (PTC) and a second PCM of a negative temperature coefficient switching material (NTC) arranged in series. A PTC is a material that experiences an increase in thermal resistance as its temperature is raised (i.e., it has an increasing temperature-dependent thermal resistance). A NTC is a material that experiences a decrease in thermal resistance as its temperature is raised (i.e., it has a decreasing temperature-dependent thermal resistance). The PTC and NTC may be arranged in series (i.e., layered over each other to form the dual phase change thermal diode), resulting in a larger thermal rectification value than traditional thermal diodes. In some embodiments, the PTC may be poly (N-isopropylacrylamide) (PNIPAM) and the NTC may be calcium chloride hexahydrate ($CaCl_2 \cdot 6H_2O$).

For the thermal control devices 115 described herein, the ambient 110 may be either a heat source or a heat sink. Similarly, a building interior 105 may be either a heat source or heat sink. As demonstrated by FIG. 1, whether heat is desired to be released from the building interior 105 or allowed to enter a building interior 105 may depend on the season, the location of the building, or other factors. For example, the summer (i.e., the cooling season) the building interior 105 may be the heat source, and when the thermal control device 115 is turned "ON" heat is allowed to flow out of the building interior 105 to the ambient 110 (i.e., the heat sink). As another example, in the winter (i.e., the heating season) the building interior 105 may be the heat sink, and when the thermal control device 115 is turned "ON" heat is allowed to flow into the building interior 105 form the ambient 110 (i.e., the heat source).

As used herein, the term "thermal diode" refers to a device which allows heat to flow preferentially in one direction. A thermal diode uses low thermal resistance to encourage (i.e., allow) heat flow in a desired or preferred direction and high thermal resistance discourage (i.e., prevent) heat flow in an undesirable or disfavored direction. Thermal diodes are heat transfer devices that exhibit a higher thermal conductance in one specific direction, allowing preferential heat flow in that direction while minimizing heat flow in the opposite direction.

As used herein, "switching material" refers to materials with changeable thermal resistance states, which are changed by external factors. In many of the examples contained herein, the external factors are temperature, however, other external factors could be used (e.g., electrical current, magnetism, polarization, etc.). Switching materials may have different thermal resistance states, which may be "switched" based on their experience of these external factors.

In some embodiments, the thermal diodes include phase change materials (PCM) as both the PTC and NTC because phase changes and transitions are often reversible and generally associated with a relatively large change in thermal conductivity between the different phases. Any PCMs In some embodiments, a dual phase change thermal diode including PNIPAM and calcium chloride hexahydrate ($CaCl_2 \cdot 6H_2O$) may exhibit a maximum rectification of approximately 3.5, which is higher than any passive thermal diode reported previously. PNIPAM is a thermo-responsive polymer that undergoes a thermally induced reversible phase-separation in an aqueous solution and $CaCl_2 \cdot 6H_2O$ is a PCM that undergoes a reversible solid to liquid phase change. PNIPAM has been used due to its near room temperature cloud point and relative ease of synthesis/procurement, and these thermal diodes containing just PNIPAM have been shown to have rectification ratios of a maximum of about 2.6.

Figure 2:
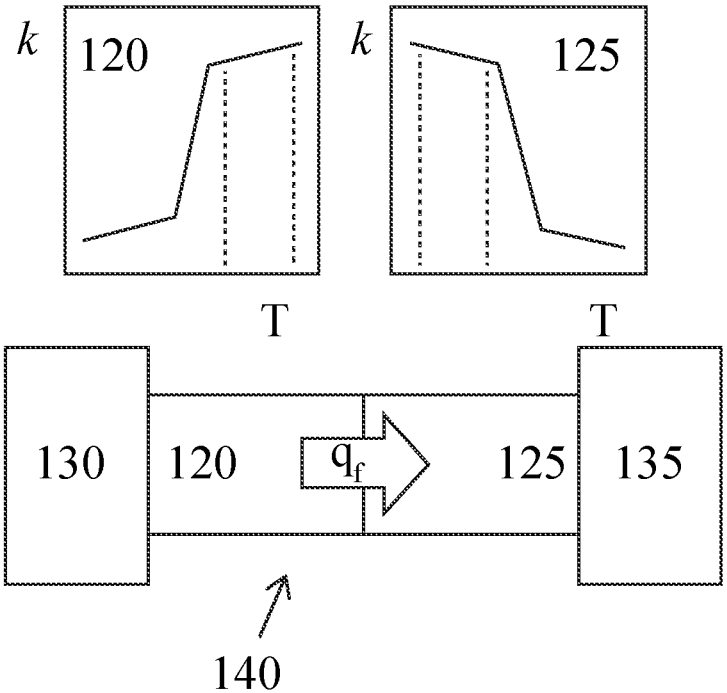
FIG. 2 shows a schematic of a dual phase change thermal diode with two phase change materials, with panel A) showing the forward configuration (i.e., the desired direction of heat flow)) and B) showing the reverse configuration (i.e., the undesired direction of heat flow), according to some aspects of the present disclosure.
Figure 2:
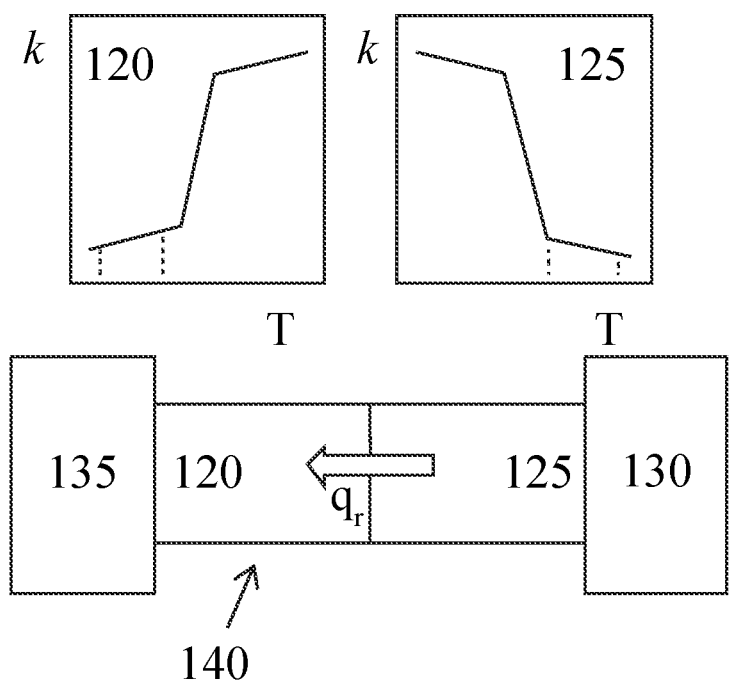

FIG. 2 shows a schematic of a dual phase change thermal diode 140 with two phase change materials (i.e., the PTC 120 and NTC 125), with panel A) showing the forward configuration (i.e., the desired direction of heat flow) and B) showing the reverse configuration (i.e., the undesired direction of heat flow), according to some aspects of the present disclosure. The dual phase change thermal diode 140 includes a PTC 120 switching material and a NTC 125 switching material arranged in series. The dual phase change thermal diode 140 is oriented such that the PTC 120 switching material is in direct thermal contact with a heat source 130 and the NTC 125 switching material is in direct thermal contact with a heat sink 135. At a first temperature, the dual phase change thermal diode 140 will allow heat to flow from the heat source 130 to the heat sink 135 (through the PTC 120 and NTC). At temperatures less than the first temperature, the dual phase change thermal diode 140 will not allow heat (or significant resist the flow of heat) from the heat source 130 to the heat sink 135.

In some embodiments, the dual phase change thermal diode 140 is a device for performing thermal management (as described in FIG. 1). As shown in FIG. 2, the dual phase change thermal diode 140 includes a PTC 120 switching material and a NTC 125 switching material. The PTC 120 switching material and NTC 125 switching material may be arranged in series (i.e., layered on top of one another), with the PTC 120 switching material in direct thermal contact with a heat source 130, and the NTC 125 switching material is in direct thermal contact with a heat sink 135. When the heat source 130 is at a first temperature the dual phase change thermal diode 140 may allow heat to flow from the heat source 130 to the heat sink 135 based on the changing thermal conductivity of the PTC 120 and NTC 125.

As demonstrated by FIG. 2, having two phase change materials with strongly temperature dependent thermal conductivities (k) in series can result in a large value for thermal rectification than traditional thermal diodes. In the forward configuration, both the PTC 120 and NTC 125 have high k, resulting in a higher heat flow ($q_f$) whereas in the reverse configuration, both materials have low k, resulting in a lower heat flow ($q_r$), for an applied temperature bias of $\Delta T = T_H - T_C$, where $T_H$ is the temperature of the hot-side (i.e., heat source 130), and $T_C$ is the temperature of the cold side (i.e., heat sink 135), the heat source 130 and the heat sink 135 may the building interior 105 or the ambient 110, depending on the season (as described in FIG. 1). The thermal rectification is then defined as the ratio of the heat flow in the forward configuration (panel A of FIG. 2) to the heat flow in the reverse configuration (panel B of FIG. 2). The dual phase change thermal diode 140 performance can also be expressed in terms of the thermal conductance (G) in the respective configurations. The expression for the thermal rectification is given in Eq. 1.

$$\gamma = \frac{q_f}{q_r} = \frac{q_f / \Delta T}{q_r / \Delta T} = \frac{G_f}{G_r} \qquad \text{Eq. 1}$$

Owing to phase transition, a PTC 120 may increase the conductance in the forward configuration (Panel A of FIG. 2) and an NTC 125 may decrease the conductance in the reverse configuration (Panel B of FIG. 2), and both these could lead to an increase in thermal rectification. Traditional thermal diodes with a single-phase change material have been demonstrated with thermal rectification ratios up to about 2. As described herein, an improvement to the performance could be obtained by connecting a PTC 120 and an NTC 125 in series, thereby simultaneously increasing the forward conductance and decreasing the reverse conductance. Three features of the dual phase change thermal diode 140 as described herein may cause it to have a high thermal rectification: 1) substantially similar transition temperatures (T*) between the low and high thermal conductivity phases, 2) a length ratio of the two materials (i.e., the PTC 120 and NTC 125) designed according to Eq. 2, where L is the length of the material, k is the thermal conductivity, subscripts PTC 120 and NTC 125 refer to the type of the material, and superscripts hi and lo denote higher and lower thermal conductivity phase, respectively, and 3) the applied temperature bias is described by Eq. 3.

$$\frac{L_{PTC}}{L_{NTC}} = \sqrt{\frac{k_{NTC}^{hi} \, k_{NTC}^{lo}}{k_{PTC}^{hi} \, k_{PTC}^{lo}}} \qquad \text{Eq. 2}$$

$$\frac{T^* - T_C}{T_H - T^*} = \sqrt{\frac{k_{NTC}^{lo} \, k_{PTC}^{hi}}{k_{NTC}^{hi} \, k_{PTC}^{lo}}} \qquad \text{Eq. 3}$$

If the above three features are present/conditions are met, the obtained thermal rectifications may be determined by Eq. 4.

$$\gamma = \sqrt{\frac{k_{NTC}^{hi} \, k_{PTC}^{hi}}{k_{NTC}^{lo} \, k_{PTC}^{lo}}} \qquad \text{Eq. 4}$$

For the exemplary dual phase change thermal diodes 140 presented herein, a solution of poly (N-isopropylacrylamide) (PNIPAM) in water is used as the PTC 120. PNIPAM exhibits phase separation beyond a critical temperature (referred to as cloud point, $T_c$) of about 32° C. Below this $T_c$, PNIPAM is mostly water soluble, but above this $T_c$ the PNIPAM will not dissolve in water. Other thereto-responsive materials with an increasing temperature-dependent thermal conductivity may be used for the PTC 120. Examples of such materials suitable for the PTC 120 include poly(N-n-propylacrylamide) (PNNPAM), poly(N-cyclopropylacrylamide) (PNCPAM), poly(N,N-diethylacrylamide) (PDEAM), poly(N—(N0-isobutylcarbamide)propyl methylacrylamide) (PiBuCPMA), poly(N-(2-methoxy-1,3-dioxan-5-yl) methacrylamide) (PNMM), poly(N-vinylisobutyramide) (PNVIBA), poly(N-vinyl-n-butyramide) (PNVBA), poly(N-acryloylpyrrolidine) (PAPR), poly(N—(N0-ethylcarbamido)propyl methacrylamide) (PiBuCPMA), poly(N-(1-hydroxymethyl)propylmethacrylamide) (PHMPMA), poly[N-(2,2-dimethyl-1,3-dioxolane)methyl] acrylamide (PDMDOMA), poly([N-(2,2-dimethyl-1,3-dioxolane)methyl] acrylamide-co-[N-(2,3-dihydroxyl-n-propyl)] acrylamide), poly(N-(2-ethoxy-1,3-dioxan-5-yl) methacrylamide) (PNEM), poly(N-(2,2-di-methyl-1,3-dioxan-5-yl) methacrylamide) (PNDMM), poly(N-(2,2-di-methyl-1,3-dioxan-5-yl) acrylamide) (PNDMA), copolymer of N-isopropylmethacrylamide and a methacrylamide monomer with labile hydrazone linkages, poly(trans-N-(2-ethoxy-1,3-dioxan-5-yl)acrylamide) (PtNEA), poly(N-acryloyl-N0-propylpiperazine) (PNANPP), poly(N-vinylcaprolactam) (PVCa), poly(N-vinylpyrrolidone) (PVPy), poly[N-(2-methacryloyloxyethyl) pyrrolidone] (PNMP), Poly(N-ethylpyrrolidine methacrylate) (PEPyM), poly(dimethylaminoethyl methacrylate) (PDMAEMA), poly(methacrylamide) (PMAAm), poly(2-(2-methoxyethoxy)ethyl methacrylate) (PMEO2MA), poly(2-[2-(2-methoxyethoxy)ethoxy]ethyl methacrylate) (PMEO3MA), poly(oligo(ethylene glycol) methacrylate (POEGMA), poly([oligo(2-ethyl-2-oxazoline) methacrylate]-co-(methyl methacrylate)), poly(N-acryloyl-1-proline methyl ester) poly(A-Pro-OMe), poly(N-acryloyl-L-valine N0-methylamide) (PAVMA), Poly(N-isopropylacrylamide)-b-poly[3-(N-(3-methacrylamidopropyl)-N,N-dimethyl)ammoniopropane sulfonate] (PNIPAM-b-PSSP), poly(N-acryloylglycinamide) (PNAGA) (22-23° C.), and/or poly(N-acryloylasparaginamide) (PNAAAM).

In some embodiments, the dual phase change thermal diode 140 may include a material with thermal conductivity nearly independent of the operating temperature range (i.e., an inactive material). An example of such an inactive material is water, although other materials which are substantially inert and/or have a thermal conductivity that is not temperature dependent may be used. For the dual phase change thermal diode 140 as described herein, three different NTC 125 were tested, with PNIPAM as the PTC 120 in each case. The three NTC 125 materials were shape-stabilized poly(ethylene glycol) (ss-PEG), n-octadecane (OD), and calcium chloride hexahydrate ($CaCl_2 \cdot 6H_2O$). Note that other PTC 120 and NTC 125 materials could be used. All three materials undergo reversible phase change close to room temperature, which is accompanied by a change in thermal conductivity. While OD and $CaCl_2 \cdot 6H_2O$ change phase from solid to liquid upon heating, ss-PEG undergoes a solid to gel phase change. Table 1 lists the phase change temperature of the three NTC 125 materials, along with the thermal conductivity in the solid and liquid/gel phases.

For the NTC 125, a PCM of an inorganic salt hydrate may be used. The important feature of the NTC 125 is having a thermal conductivity that decreases with temperature. Examples of materials for NTC 125 include potassium fluoride tetrahydrate ($KF \cdot 4H_2O$), manganese nitrate hexahydrate ($Mn(NO_3)_2 \cdot 6H_2O$), calcium bromide hexahydrate ($CaBr_2 \cdot 6H_2O$), lithium nitrate hexahydrate ($LiNO_3 \cdot 6H_2O$), sodium sulfate decahydrate ($Na_2SO_4 \cdot 10H_2O$) sodium carbonate decahydrate ($Na_2CO_3 \cdot 10H_2O$), sodium orthophosphate dodecahydrate ($Na_2HPO_4 \cdot 12H_2O$), and/or zinc nitrate hexahydrate ($Zn(NO_3)_2 \cdot 6H_2O$).

TABLE 1

Thermal conductivity and the phase change temperature of the three NTC 125 materials described herein.

| NTC material | Phase change temperature (° C.) | Solid phase k (W/m-K) | Liquid/gel phase k (W/m-K) |
|---|---|---|---|
| Shape-stabilized Poly(ethylene glycol) | 32 | 0.29 | 0.25 |
| n-Octadecane | 28 | 0.33 | 0.15 |
| Calcium chloride hexahydrate | 29 | 1.09 | 0.53 |

All three NTC 125 materials satisfy the first criterion (similar phase transition temperature for PTC 120 and NTC 125) for optimal performance. During this experiment, a constant value of $T_C$ is maintained while sweeping over a range of $T_H$ and therefore do not directly optimize for the temperature bias (Eq. 3). Furthermore, it was not attempted to optimize for length either (Eq. 2). This is partly because the effective thermal conductivity of PNIPAM solution is dependent on natural convection, which is a function of the applied temperature bias and the length. Therefore, the length optimization in this scenario is non-trivial.

Three dual phase change diodes 140 with PNIPAM as the PTC 120 material were investigated, and ss-PEG, OD, and $CaCl_2 \cdot 6H_2O$ as the NTC 125 material. Experiments were performed on the three dual phase change thermal diodes 140 in two configurations—forward and reverse under the same temperature conditions as the previous experiments. The conductance and rectification of the three thermal diodes are shown in FIG. 3.

For all three dual phase change thermal diodes 140, as $T_H$ exceeded the phase transition temperature of the NTC 125 in the reverse configuration, visible phase change was observed in the NTC 125 (which was contained in a cylinder), the extent of which increases with increasing hot side temperature. Due to the lower k of the melt compared to the solid, the phase change results in an overall decrease in conductance with increasing hot side temperature. This decrease in conductance is directly correlated to the decrease in thermal conductivity of the NTC 125 material. ss-PEG undergoes the smallest decrease in thermal conductivity upon phase transition and thus, the PNIPAM and ss-PEG dual phase change thermal diode 140 showed the smallest decrease in reverse conductance upon phase transition. The inverse is true for the other two dual phase change thermal diodes 140. For all three dual phase change thermal diodes 140, no significant phase separation in PNIPAM was observed in reverse configuration.

In the forward configuration, the observed trend for all 3 dual phase change thermal diodes 140 is similar to a PNIPAM and water thermal diode. Phase separation in PNIPAM starts when the $T_H$ approximately 32° C. and is not immediately accompanied by a sudden increase in effective conductance, but as the hot side temperature increases to approximately 45° C., an approximately 60% increase in conductance was observed, owing to the increased convection in the phase separated solvent and increased conduction through the phase separated PNIPAM network. Since PNIPAM's phase-separation is present in all three dual phase change thermal diodes 140, the absolute value of forward conductance is directly proportional with the solid phase thermal conductivity of the NTC 125 material.

Figure 3:
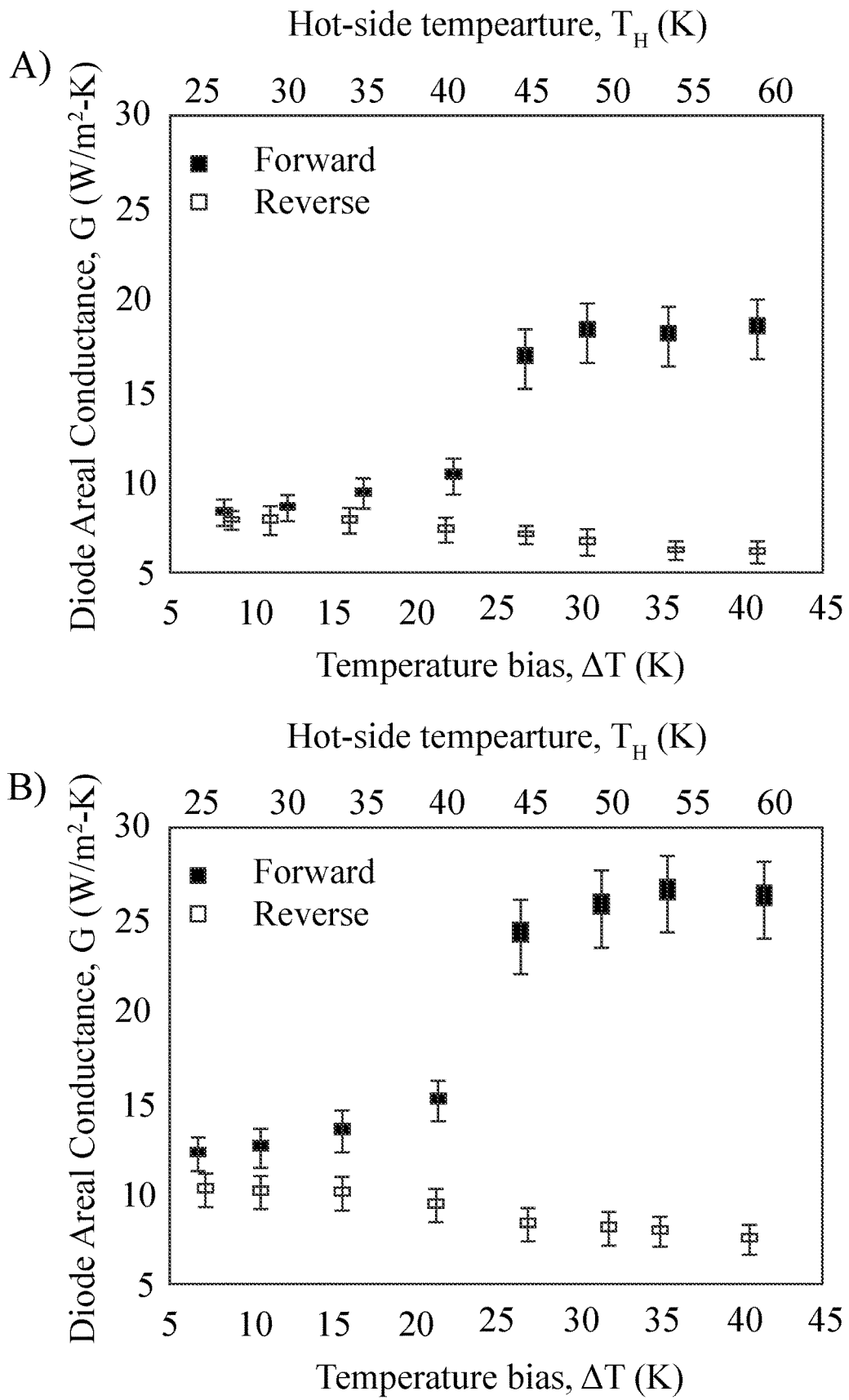
FIG. 3 illustrates measured conductance for the three dual phase change thermal diodes, Panel A shows poly (N-isopropylacrylamide) (PNIPAM) and octadecane, Panel B shows PNIPAM and calcium chloride hexahydrate ($CaCl_2 \cdot 6H_2O$), and Panel C shows PNIPAM and shape-stabilized polyethylene glycol) (ss-PEG), in forward and reverse modes and rectification ratios for the three dual phase change thermal diodes (shown in Panel D), according to some aspects of the present disclosure.
Figure 3:
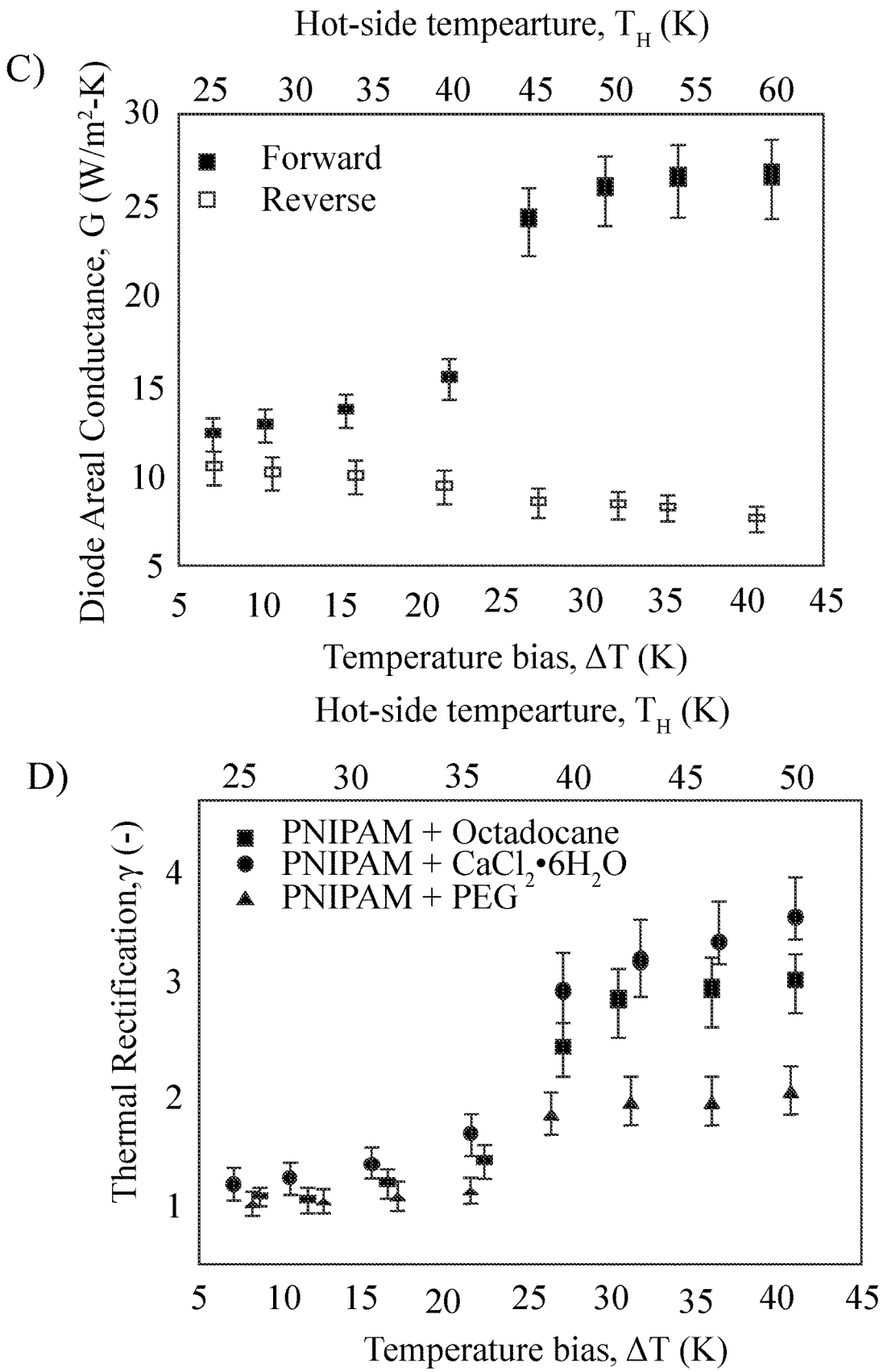

FIG. 3 illustrates measured conductance for the three dual phase change thermal diodes 140 (Panel A shows PNIPAM and octadecane, Panel B shows PNIPAM and CaCl2·6H2O, and Panel C shows PNIPAM and ss-PEG), in forward and reverse modes and rectification ratios for the three dual phase change thermal diodes (Panel D), according to some aspects of the present disclosure. The filled data points represent the forward mode, and the open data points represent the reverse mode. (d) Rectification ratio for the three dual phase change thermal diodes 140 as a function of the applied temperature bias. All diodes exhibit a similar trend in the forward and reverse mode, and the rectification. PNIPAM and $CaCl_2 \cdot 6H_2O$ diode has the highest value of rectification among the three dual phase change thermal diodes 140 studied.

Panel D of FIG. 3 shows the calculated rectification for all three dual phase change thermal diodes 140. The dual phase change thermal diode 140 with a PTC 120 of PNIPAM and a NTC 125 of $CaCl_2 \cdot 6H_2O$ exhibited the highest rectification of the three with a maximum value of approximately 3.49±0.35, for $T_C$ approximately 18° C. and $T_H$ approximately 59° C. Since $CaCl_2 \cdot 6H_2O$ has the largest solid phase thermal conductivity and undergoes the largest decrease in thermal conductivity upon phase change of the tested NTC 125 materials, it follows that the diode with $CaCl_2 \cdot 6H_2O$ as NTC 125 has the highest value of rectification. Inversely, based on ss-PEG's thermal conductivities in the two phases, it follows that the PNIPAM and ss-PEG diode is the poorest performing diode among the three mentioned here. Lastly, for the dual phase change thermal diode 140 having a PTC 120 of PNIPAM and a NTC 125 of $CaCl_2 \cdot 6H_2O$ diode, extrapolating the data might suggest that a higher $T_H$ could lead to a higher rectification, this will also increase the interface temperature beyond the melting point of $CaCl_2 \cdot 6H_2O$. This will result in significant phase-change reducing its effective thermal conductivity, and thus negatively affecting the forward conductance.

In a dual phase change thermal diode 140 a rectification ratio of approximately 3.5 was achieved using a PTC 120 material of an approximately 10 wt % PNIPAM solution in water, and a NTC 125 of $CaCl_2 \cdot 6H_2O$. The high value of rectification has two contributions: (1) an increase in conductance in the forward configuration resulting from the enhancement in convection post phase-separation in PNIPAM and conduction through the phase-separated polymer network, and (2) a decrease in conductance in the reverse configuration resulting from the lower thermal conductivity of the CaCl$_2$·6H$_2$O melt compared to the solid phase. The relative contributions of convection and conduction through the phase-separated PNIPAM solution using a third configuration, in addition to the forward and reverse configurations were explored.

To evaluate different NTC 125 materials, poly (N-isopropylacrylamide) (having a molecular weight of approximately 30,000 Da), octadecane (in solution with a concentration of approximately 99%), and calcium chloride hexahydrate (in solution with a concentration of approximately 98%) were all obtained commercially without any further purification. Then approximately 1.5, approximately 4, and approximately 10 wt % PNIPAM solutions were prepared by dissolving appropriate quantities of PNIPAM in water, assisted by substantially continuous stirring for approximately 24 hours at approximately room temperature till a substantially clear solution was obtained.

Shape-stabilized poly (ethylene glycol) (ss-PEG) was synthesized by sol-gel method. PEG with a molecular weight of about 1000 Da was melted at about 50° C. Ethanol, water, sulfuric acid, and tetraethyl orthosilicate (TEOS) were added to the melted PEG. The host matrix was in situ formed from tetraethyl orthosilicate (TEOS), controlling the condensation rate in a second alkaline step using sodium hydroxide (NaOH). Finally, the mixture was cured in a heating oven at approximately 50° C. overnight (i.e., approximately 12 hours).

The materials were all sealed in acrylic cylinders (approximately 0.75 cm outer diameter by approximately 0.5 cm inner diameter by 1 cm length) using copper tape. To prevent mass transfer between the cylinder and the atmosphere, a water-proof epoxy was used between the acrylic and copper to prevent any moisture transfer between the materials and the ambient. All NTC materials were loaded in liquid/gel form at approximately 50° C. to ensure that the entire volume of cylinder was filled, followed by a cooling step to approximately room temperature (i.e., in the range of about 68° F. to about 77° F.) to allow the material to resolidify. This was followed by another heating-cooling cycle to verify the sealing against material loss due to volume changes during temperature cycling. Thermal conductivity of the aqueous PNIPAM solution was measured using a guarded heat flow meter. PNIPAM solution was loaded into the sample holder (approximately 2 cm diameter by approximately 1 cm height).

The acrylic cylinders loaded with the different materials are placed in series between a hot side and a cold side. During the experiment, the temperature of the cold side is maintained at approximately 18° C., whereas the temperature of hot side is varied between about 25 and about 60° C. The temperatures of the hot side ($T_H$), cold side ($T_C$), and the interface between the two cylinders are monitored and a heat flux sensor, is positioned at the interface between the cylinders to measure the heat flow through the diode.

Figure 6:
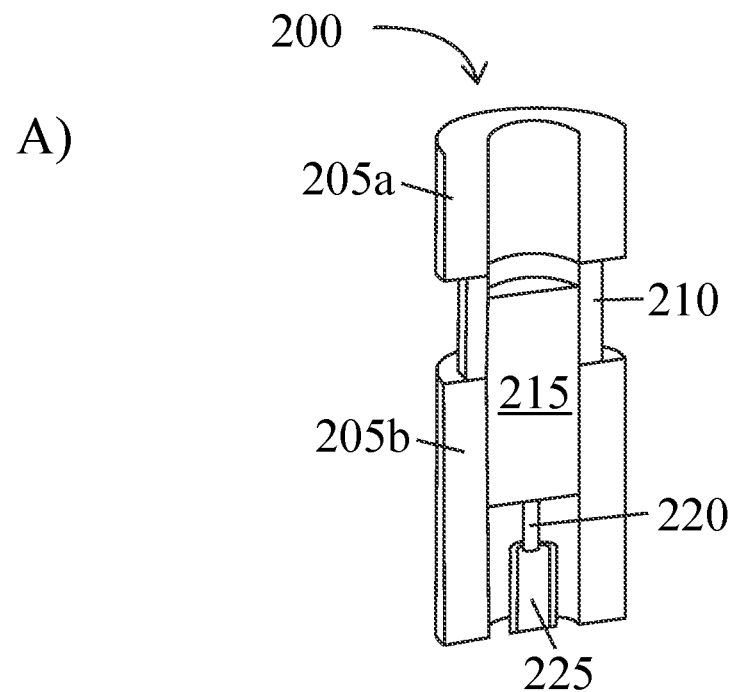
FIG. 6 illustrates a contact-based thermal switch in both the "off" configuration (Panel A) and "on" configuration (Panel B), according to some aspects of the present disclosure.
Figure 6:
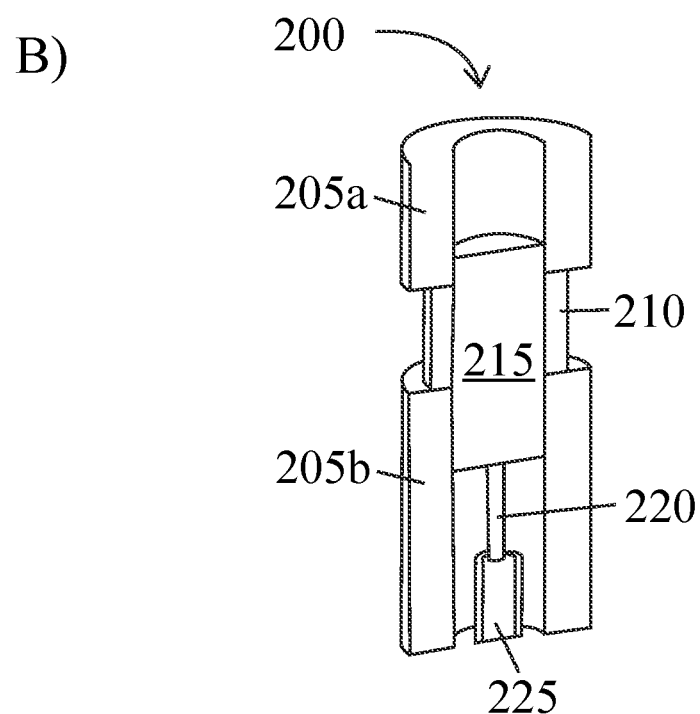

The thermal conductivity of an approximately 10% PNIPAM aqueous solution, which has a cloud point of about 32° C., was measured as a function of temperature to observe the effect of phase separation, and the results are documented in FIG. 6. The measurement was performed using a guarded heat flow meter. The orientation of the sample was such that the applied temperature gradient was in substantially the same direction of gravity, thus making the measured thermal conductivities substantially independent of any convective effects. The temperature-dependent thermal conductivity follows a monotonically increasing trend, and the effect of phase separation, if any, is not obvious in the observed data. An approximately 20% increase in thermal conductivity is noticed over a temperature range of approximately 40° C. This increase does not explain the increase in thermal diode conductance observed in the forward and phase-separation configurations in Panel B of FIG. 3. Therefore, this data can be used to prove the importance of the PNIPAM polymer network and convective contribution to the diode conductance.

Figure 4:
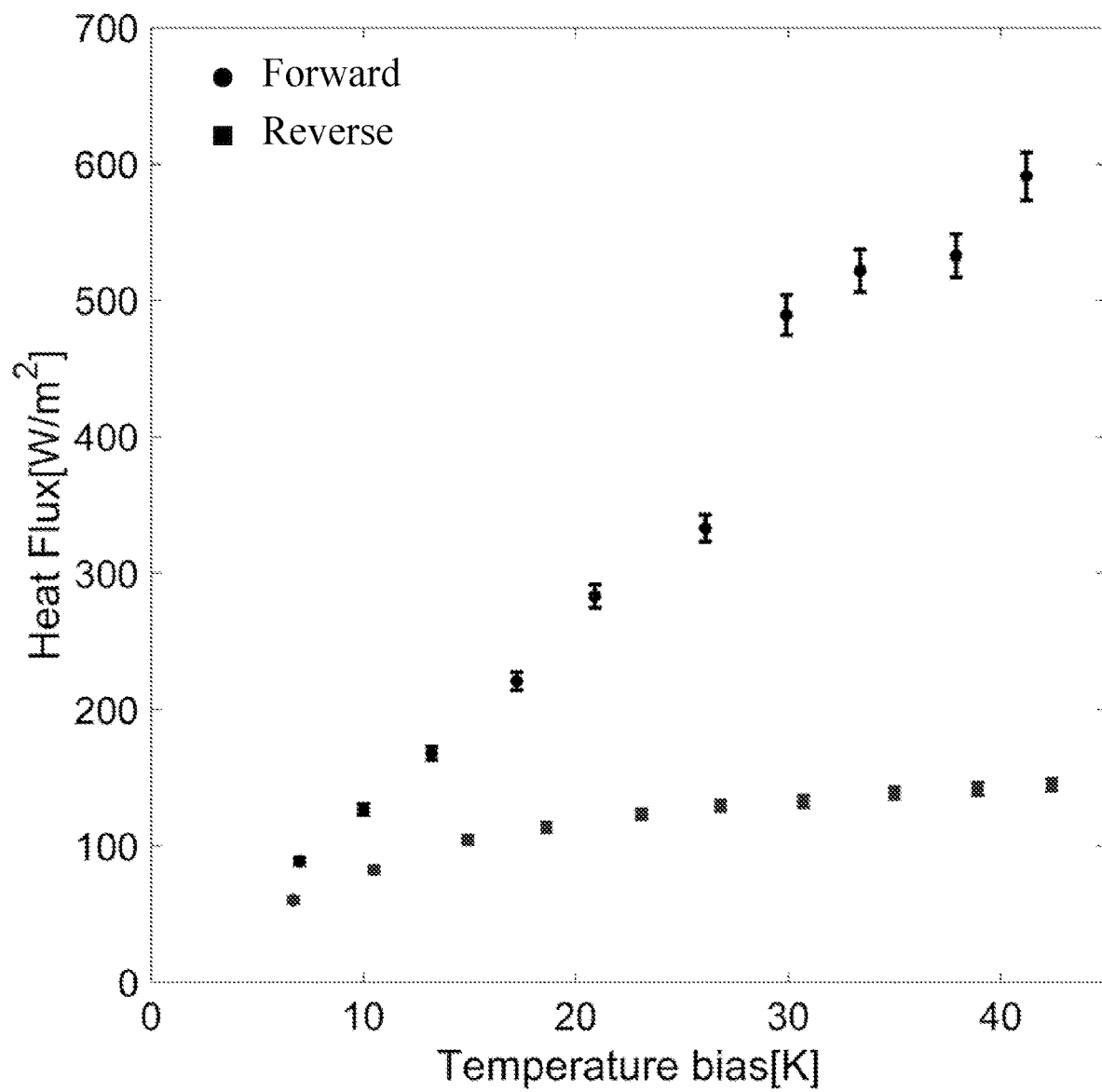
FIG. 4 illustrates the heat flux in response to temperature bias for a dual phase change thermal diode, according to some aspects of the present disclosure.

FIG. 4 illustrates the heat flux in response to temperature bias for a dual phase change thermal diode, according to some aspects of the present disclosure. The heat flux sensor outputs the heat flux through it as a voltage measurement, owing to thermoelectric effect. The voltage and heat flux are related according to the following calibration:

$$q'' = \frac{V}{(\alpha + \beta(T_{int} - 22.5))} \times 10^6 \qquad \text{Eq. 5}$$

Here, V is the measured voltage (in Volts), and $T_{int}$ is the interface temperature (in ° C.), and $\alpha$ and $\beta$ are manufacturer provided calibration coefficients given by:

$$\alpha = 3.15 \frac{V}{W/m^2} \text{ and } \beta = 0.0039 \frac{V}{W \cdot K/m^2} \qquad \text{Eq. 6}$$

The diode areal conductance is then calculated using:

$$G = \frac{q''}{T_H - T_C} = \frac{V}{(T_H - T_C)(\alpha + \beta(T_{int} - 22.5))} \times 10^6 \qquad \text{Eq. 7}$$

The uncertainty in G was calculated using a standard error propagation analysis, given by $$U_G = \sqrt{\begin{array}{c}\left(\frac{\partial G}{\partial V} \cdot U_V\right)^2 + \left(\frac{\partial G}{\partial T_H} \cdot U_T\right)^2 + \left(\frac{\partial G}{\partial T_C} \cdot U_T\right)^2 + \left(\frac{\partial G}{\partial T_{int}} \cdot U_T\right)^2 + \\ \left(\frac{\partial G}{\partial \alpha} \cdot U_\alpha\right)^2 + \left(\frac{\partial G}{\partial \beta} \cdot U_\beta\right)^2\end{array}} \qquad \text{Eq. 8}$$

where $U_p$ is the fractional uncertainty associated with the measurement p. For each data point, the system is allowed to reach a quasi-steady state, and so $T_H$, $T_C$ and $T_{int}$ are substantially constant during a measurement. Therefore, the value of $U_T$ is simply the uncertainty of the thermocouple reader (approximately ±0.5° C.). The uncertainties in $\alpha$ and $\beta$ are provided by the equipment manufacturer. The uncertainty in voltage measurement is estimated based on the standard deviation at every data point. Once the quasi-steady state is reached (i.e., temperature readings are substantially stable), the voltage may oscillate around a mean value. These readings are monitored over a period of time, and the lower and upper bounds of the measurement set are used to estimate the uncertainty. This value may be around approximately 5% and is the largest contributor to the uncertainty in conductance measurement.

In the single-phase change diode, an aqueous solution of PNIPAM was used as the phase change material and DI water is used as the second material. Due to the orientation of the diode in forward configurations, there is convection present in DI water which is absent in the other two configurations. This will enhance the effective thermal conductivity of water in the forward mode, which can be calculated using Nusselt number correlations for natural convection. The Nusselt number ($\overline{Nu}_L$) for natural convection between two horizontal plates with heating from the bottom is given by:

$$\overline{Nu}_L = \frac{hL}{k} = 0.069 Ra_L^{1/3} Pr^{0.074} \quad \text{Eq. 9}$$

Here, L is the length of the cylinder (m), h is the convective coefficient (W/m$^2$-K), k is the thermal conductivity (W/m-K), and Pr is the Prandtl number (dimensionless). $Ra_L$ is the Rayleigh number given by:

$$Ra_L = \frac{g\rho^2 \beta C_p (\Delta T) L^3}{k\mu} \quad \text{Eq. 10}$$

Here, g is the gravitational acceleration constant (m$^2$/s), $\rho$ is the density (kg/m$^3$), $\beta$ is the coefficient of volumetric expansion (1/K), $\mu$ is the dynamic viscosity (Pa·s), $C_p$ is the specific heat (J/kg-K), and $\Delta T$ is the temperature difference between the ends of the cylinder (K). All material properties are to be evaluated at the mean temperature of the cylinder (i.e., mean value of the interface and cold side temperature). In the forward mode, $\Delta T$ is the temperature difference between the interfacial temperature and the cold side. During the experiment, the interface temperature and cold side temperature are measured, and the material properties for water as a function of temperature are readily available. Using Eqs. 9 and 10, temperature data, and material properties, the effective thermal conductivity (=k+hL) was calculated.

Figure 5:
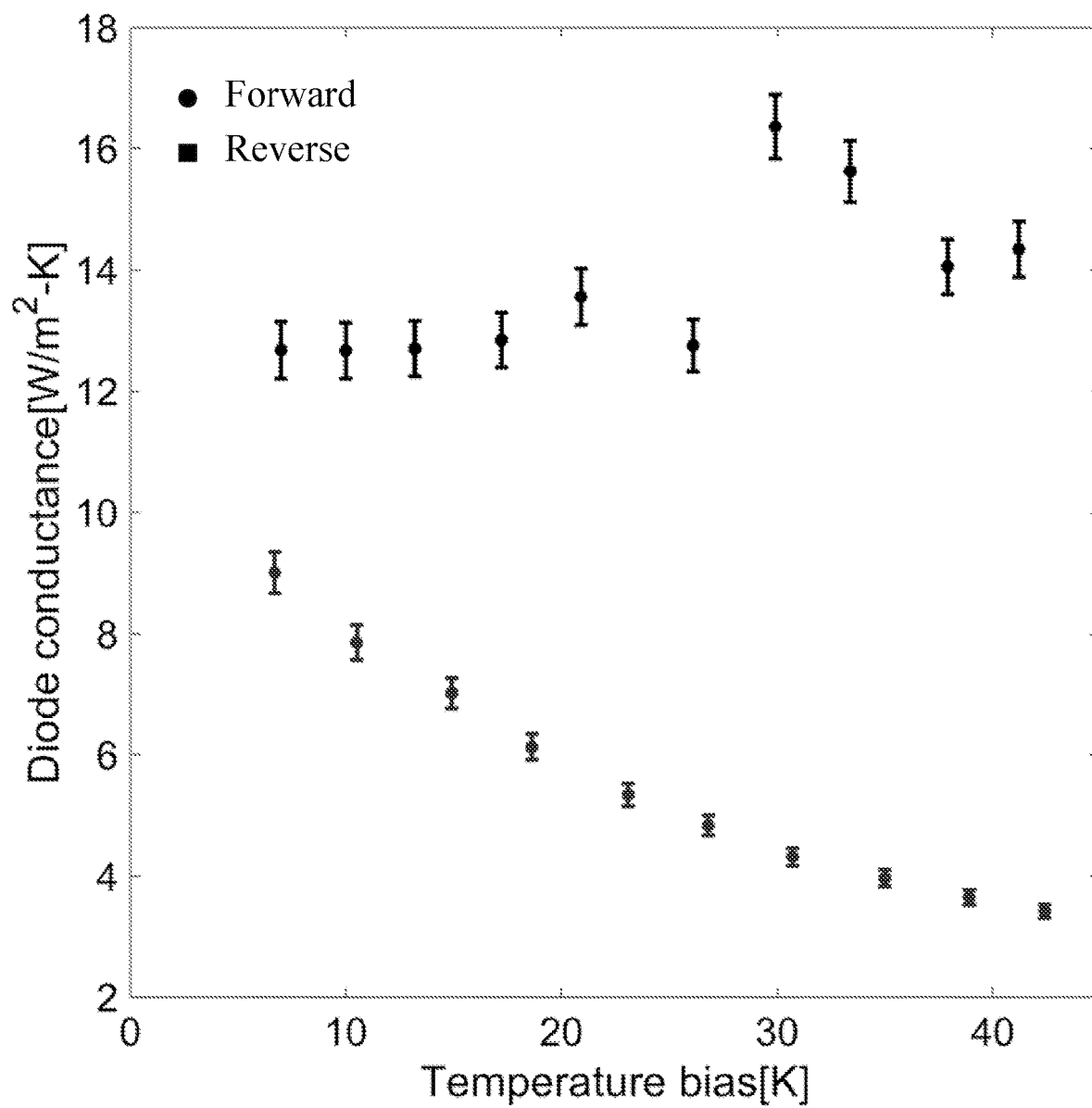
FIG. 5 illustrates the thermal conductance of a dual phase change thermal diode in response to temperature bias, according to some aspects of the present disclosure.

FIG. 5 illustrates the thermal conductance of a dual phase change thermal diode in response to temperature bias, according to some aspects of the present disclosure. FIG. 5 illustrates a proposed thermal switch in an "active" mode (left panel) and an "inactive" model (right panel), according to some aspects of the present disclosure. The inner thermally conductive cylinder may be moved back and forth, thereby making and breaking the thermal circuit. Preliminary simulations indicate that this simple system may provide a switch ratio of up to about 130. Various mechanisms may be used to varying the thermal contacts.

The effective thermal conductivity of DI water in the forward configuration constantly increases with $T_H$, as the interfacial temperature continuously increases too, resulting in an increase in h. The thermal conductivity, k, of water at these temperatures is approximately 0.6 W/m-K and so, the effective thermal conductivity increases from about 2k to about 4k, highlighting the importance of convection in these diodes.

Among other things, the present disclosure relates to an active contact-based thermal switch (i.e., a thermal control device), where the distance between the two thermally contacting surfaces can be changed between zero to a predetermined value. When the distance between the contacting surfaces is zero, there is minimal thermal contact resistance; when the contact is disturbed by increasing distance large thermal resistance may be generated. Thermal switches act as the thermal bridge between insulation materials in the wall cavity. By varying the thermal resistance and area fraction of the switch as described herein, the effective R value of the insulation layer can be greatly changed. Based on some preliminary simulations, change in effective R value by about 5 to about 10 times enhances free natural cooling/heating, leading to approximately 30% to approximately 40% reduction in wall-related heat gains.

In some embodiments, the present disclosure includes a thermal control device 115 that can be deployed as a thermal switch. A thermal rectification of 17.5, with a switching temperature of approximately 50° C. was demonstrated with the contact-based thermal switch as described herein. The regulator capabilities of the thermal control device 115 is based on a contact mechanism that has a conducting connector that alternates between OFF and ON state based on whether the thermal contact is with an insulator or a conductor. In some embodiments, the rectification of the regulator (i.e., the thermal control device) can be significantly improved by switching to a different set of materials.

In some embodiments, the distance between the two thermally conducting surfaces can be changed between zero to a predetermined value. When the distance between the contacting surfaces is zero, there is minimal to no thermal contact resistance; when the contact is disturbed by increasing distance large thermal resistance may be generated. In some embodiments, a connector may be used to change the distance between the conductors. Thermal switches act as the thermal bridge between insulation materials in the wall cavity. By varying the thermal resistance and area fraction of the switch as described herein, the effective R value of the insulation layer can be greatly changed. A change in effective R value by 5-10 times enhances free natural cooling/heating, leading to approximately 30-40% reduction in wall-related heat gains.

FIG. 6 illustrates a contact-based thermal switch 200 in both the "off" configuration (Panel A, the "first position") and "on" configuration (Panel B, the "second position"), according to some aspects of the present disclosure. Two conductors 205a and 205b of (0.5 cm inner diameter by 1 cm outer diameter) were concentrically aligned with an insulator 210 (0.5 cm inner diameter by 0.75 cm outer diameter). In some embodiments, the conductors 205 may be cylinders made of a conductive material, such as aluminum, gold, copper, silver, or an alloy thereof. In some embodiments, the insulator may be made of an insulative material, such as plastic, acrylic, fiberglass, or ceramic. For this example, the lengths of the conductors were approximately 6.5 cm (205b) and approximately 2 cm (205a), although other lengths could be used. An aluminum rod (0.5 cm diameter and 2.5 cm length) was used as the connector 215. The connector 215 can slide inside the three cylinders (i.e., the conductors 205a, 205b, and the insulator 210) and acts as the key switching mechanism of the contact-based thermal switch 200. To ensure that the connector 215 slides with very little friction, the diameter of the connector 215 was maintained at a value slightly lower than 0.5 cm. In the "OFF" state (i.e., low conductance configuration of the thermal control device or the "first position"), the connector 215 is positioned to only contact the second conductor 205b and the insulator 210. The path of least resistance to heat flow consists of the low thermal conductivity insulator 210, thus resulting in an overall low conductance. In the "ON" state (i.e., high conductance configuration of the thermal control device or the "second position"), the connector 215 is positioned to contact both conductors 205a and 205b and the insulator 210. The path of least resistance to heat flow in this configuration consists entirely of the high thermal conductivity conductors 205, thus resulting in an overall high conductance.

In the OFF state (as shown in Panel A of FIG. 6), the connector 215 only contacts the second conductor 205b and the insulator 210, while in the ON state (as shown in Panel B of FIG. 6), the connector 215 also contacts the first conductor 205a. The was motor 225 is also shown in both cases, along with the displacement of the piston 220.

FIG. 6 illustrates a second device for performing thermal management (i.e., a thermal control device 115) of a contact-based thermal switch 200, which includes a first conductor 205a in direct thermal contact with a heat source 130, a second conductor 205b in direct thermal contact with a heat sink 135, an insulator 210 positioned between the first conductor 205a and the second conductor 205b, a connector 215 longer than the length of the insulator 210, and a piston 220 configured to move the connector 21. The connector 215 moves between a first position (i.e., OFF) and a second position (i.e., ON). In the first position the connector 215 is in thermal contact with only the first conductor 205a, and the contact-based thermal switch 200 is resistive to heat flow from the heat source 130 to the heat sink 135. In the second position the connector 215 is in thermal contact with both the first conductor 205a and the second conductor 205b, and the contact-based thermal switch 200 allows heat to transfer from the heat source 130 to the heat sink 135. The change in positions of the connector 215 is triggered by the temperature of the heat source 130. At a first temperature (for example, a temperature greater than about 30° C.) the piston 220 moves the connector 215 from the first position to the second position. At a second temperature (for example, a temperature less than about 30° C.) the piston 220 moves the connector 215 from the second position to the first position. The piston 215 is powered (or moved) by the motor 225, which may include a phase change material (PCM), such as a wax, which changes state at about the first temperature.

The connector 215 can be actuated either passively, or actively to have the contact-based thermal switch 200 function. In some embodiments, a motor 225 of a thermally actuated wax motor may be used to power the piston 220. In some embodiments, the present disclosure includes a passive method of actuation that is driven solely by the temperature, using a motor 225 of wax that is located in between the heat source (not shown in FIG. 6) and the connector 220. A motor 225 of wax is a linear actuator device which uses the phase-change behavior of the wax and the resulting volumetric expansion to control the movement of a piston 220. In the present disclosure, the movement of the piston 220 may be used to control the position of the connector 215. The motor 225 used in the contact-based thermal switch 200 contains a paraffin wax that melts at about 50° C. and may result in a piston 220 movement of approximately 5 mm. The contact-based thermal switch may be designed to ensure this movement is sufficient to transition from the OFF state (i.e., the first position) to ON state (i.e., the second position). The wax motor 225 used in this example can be replaced by a linear electrical motor or an electrically actuated wax motor. The motor 225 may be a component, or plurality of components, capable of moving the piston 220 when the heat source 130 reaches a certain temperature (i.e., the first temperature). Wax may refer to a phase change material which is substantially chemically inert and non-corrosive. Examples of paraffin wax include n-octadecane, n-heptadecane, hexadecane, butyl stearate, polyethylene glycol, n-heneicosane, and/or other paraffins. Other waxes (i.e., phase change materials) which may be used include fatty acids, salt hydrates (such as calcium chloride hexahydrate ($CaCl_2 \cdot 6H_2O$)), and/or other PCMs.

In this example, the contact-based thermal switch 200 may be sandwiched between a hot side (i.e., a heat source 130) and a cold side (i.e., a heat sink 135). The heat source 130 was a Copper block with cartridge heater inserts, whose temperature ($T_H$) was varied between about 30° C. and about 60° C. The heat sink 135 was a Peltier cooling unit whose temperature ($T_C$) was maintained at approximately 20° C. Two heat flux sensors are used to measure the heat flux—one closer to the heat source 130 (about 3 cm from the heat source 130) and one closer to the heat sink 135 (about 1 cm from the heat sink 135). The contact-based thermal switch 200 may be well-insulated with a polyurethane foam to minimize parasitic heat losses. All reported measurements were carried out when the contact-based thermal switch 200 had reached a quasi-steady state (i.e., when the measured values have less than about 5% temporal variation).

In some embodiments, the connector 215 and the first and second conductors 205a and 205b may be made of at least one thermally conductive material. Examples of thermally conductive materials include aluminum, gold, silver, and/or copper. Any material capable of conducting heat may be used for the connector 215 and the conductors 205.

In some embodiments, the insulator 210 may be made of a substantially thermally insulative material (i.e., a material having a high thermal resistance). Examples of thermally insulative materials include plastics, acrylic, fiberglass, or ceramic. Other materials with large thermal resistances may be used.

For an applied temperature bias, the performance of the contact-based thermal switch 200 may be quantified using overall areal conductance, henceforth referred to as areal conductance (G). The areal conductance was calculated using $$G = \frac{q''}{\Delta T} \qquad \text{Eq. 11}$$

where q" is the measured heat flux (W/m$^2$), and $\Delta T$ is the applied temperature bias (=$T_H$-$T_C$). The rectification was defined in Eq. (2), where the subscripts OFF and ON refer to the state of the contact-based thermal switch 200.

$$\gamma = \frac{G_{ON}}{G_{OFF}} \qquad \text{Eq. 12}$$

Figure 7:
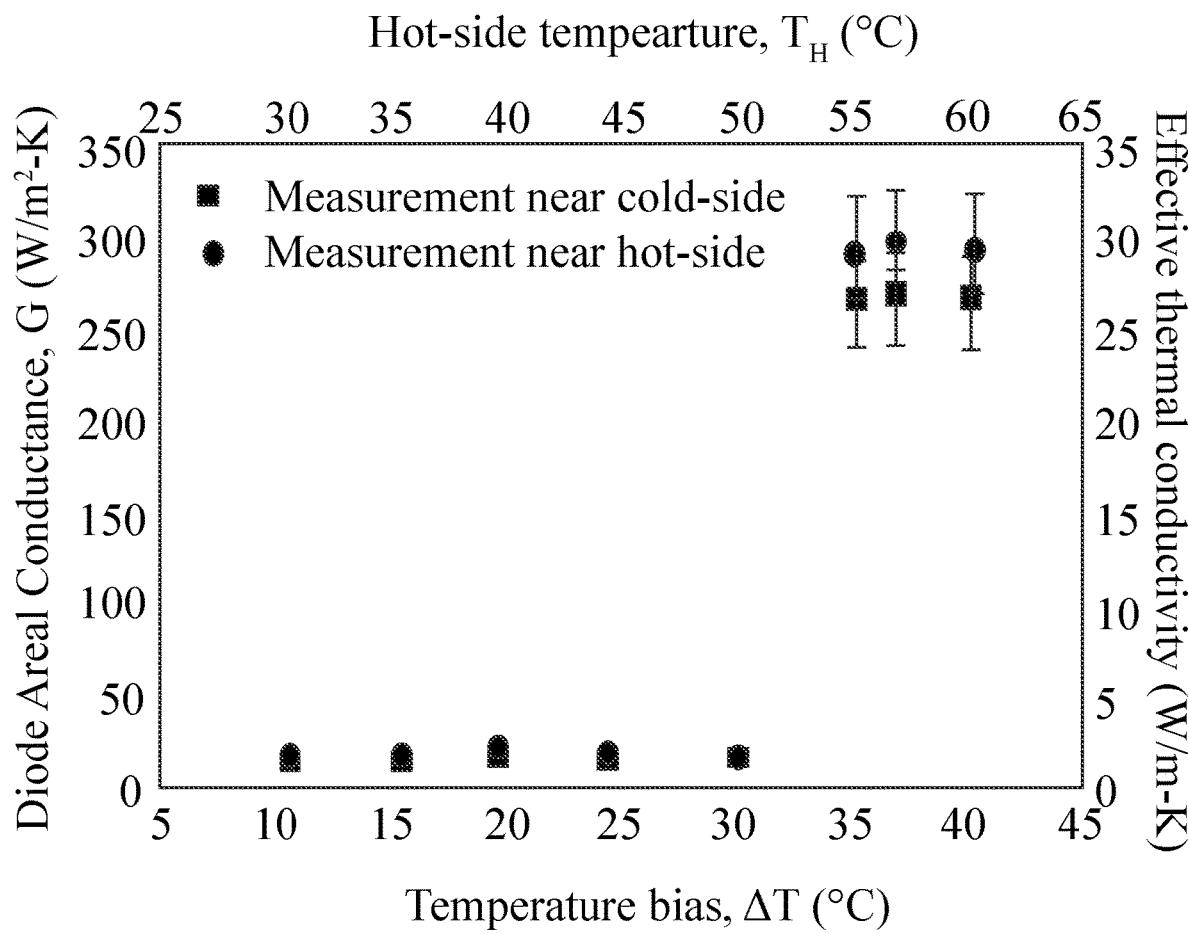
FIG. 7 illustrates areal conductance of the contact-based thermal switch as a function of the temperature bias and the hot-side temperature, according to some aspects of the present disclosure.

Table 2 shows the conductance as a function of the applied temperature bias, and FIG. 7 depicts the same data in a plot. Two different conductance values—based on the two flux sensors used are reported. The average of the two conductance is also reported, and this value is referred to, simply, as the conductance. Since no significant movement in the piston 220 is noticed until about 50° C., there is also no significant observable change in the areal conductance and the regulator remains in OFF state (i.e., the second position, shown in Panel A of FIG. 6). Once the temperature exceeds about 50° C., the wax starts to melt, gradually displacing the piston 220, and in turn move the connector 215. Further increase in temperature results in proportional upwards movement of the connector 215, and as the hot side exceeds about 51° C., the displacement is sufficient to move the connector 215 to establish contact with the first conductor 205a, and this is evident in the sharp increase in the conductance of the contact-based thermal switch 200. As $T_H$ increases beyond this value, the connector 215 moves further upwards but the combined area of contact between the connector 215 and the two conductors 205 remains the same, and the areal conductance remains nearly constant. The conductance increases by a factor of approximately 17.5 in the set-up, which is among the highest for passive thermal switches. From Table 1, it is also evident that the measured conductance by the flux sensor near the heat sink 135 is consistently lower than that measured by the sensor near the heat source 130 by approximately 10%. This suggests that the parasitic heat loss plays a crucial role in the heat transfer through the contact-based thermal switch 200.

TABLE 2

Measured conductance of the contact-based thermal switch 200 near the heat source 130 and heat sink 135, as a function of the heat source 130 temperature. The heat sink 135 was maintained at a substantially constant temperature of approximately 20° C.

| Hot-side temperature, $T_H$ (° C.) | Temperature bias, $\Delta T$ (° C.) | Measured conductance near the hot-side, $G_{hot}$ (W/m²-K) | Measured conductance near the cold-side, $G_{cold}$ (W/m²-K) | Avg. conductance, G (W/m²-K) |
|---|---|---|---|---|
| 30.7 | 10.7 | 16.9 | 15.2 | 16.1 |
| 35.5 | 15.5 | 17.2 | 15.9 | 16.6 |
| 39.7 | 19.7 | 18.1 | 16.3 | 17.2 |
| 44.5 | 24.5 | 17.9 | 16.2 | 17.1 |
| 50.1 | 30.1 | 19.4 | 17.6 | 18.5 |
| 55.2 | 35.2 | 293.3 | 262.3 | 277.8 |
| 57.0 | 37 | 296.9 | 265.5 | 281.2 |
| 60.4 | 40.4 | 295.5 | 263.5 | 279.5 |

FIG. 7 illustrates areal conductance of the contact-based thermal switch 200 as a function of the temperature bias and the heat source 130 temperature. The OFF and ON states of the contact-based thermal switch 200 are shown, with a switching ratio (G) of approximately 17.5 and a switching temperature of approximately 50° C.

In addition to the experimental study, the contact-based thermal switch 200 has also been simulated using a simplified model that assumes 1-D conduction heat transfer through the contact-based thermal switch 200. The thermal paste used at every interface in the experiment is accounted in the model as contact resistances. However, the model assumes there are no parasitic heat losses, which is clearly an issue with the experiment. Table 3 shows the thermal conductance of the contact-based thermal switch 200 in OFF and ON state observed during the experiment and that predicted by the model. The maximum experimental value is reported in this table. The experimentally observed rectification is comparable to the model prediction, within the limits of uncertainty. However, the thermal conductivities predicted by the model are larger by a factor of approximately 2. This suggests that the interfacial resistance is higher than the value used in the model, and the parasitic losses are significant in the contact-based thermal switch 200. Furthermore, since the diameter of the connector 215 was maintained at a value slightly smaller than the inner diameter of the conductors 205, the contact between the two might not have been uniform circumferentially which could also contribute to the disparity between model and experiments.

TABLE 3

Predicted and experimentally measured areal thermal conductance of the contact-based thermal switch 200 in the OFF and ON state, and the corresponding rectification. The predicted values were consistently higher than the experimental values suggesting the presence of high interfacial resistances and parasitic losses.

| | $G_{OFF}$ (W/m²-K) | $G_{ON}$ (W/m²-K) | $\gamma$ (—) |
|---|---|---|---|
| Model | 26.59 | 480.4 | 18.1 |
| Experiment | 16.1 ± 1.6 | 281 ± 21 | 17.5 ± 2.1 |

Figure 8:
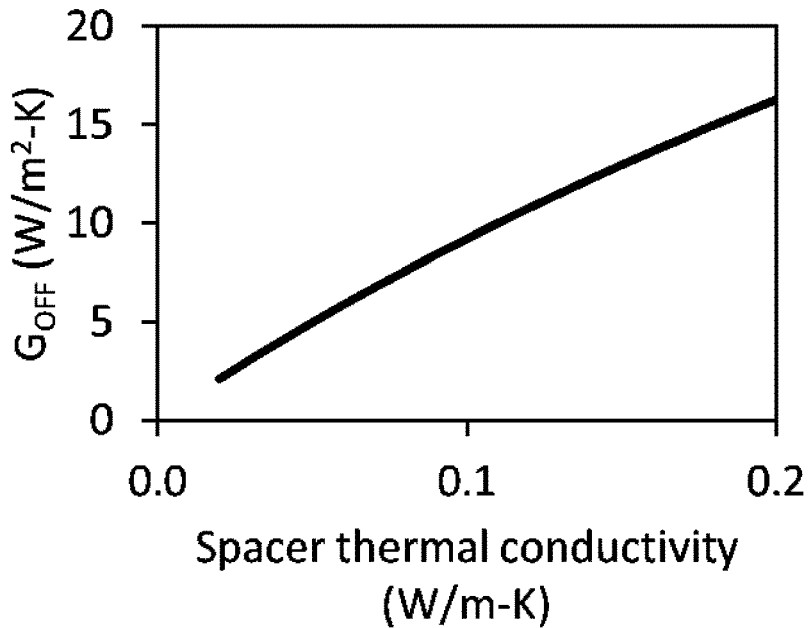
FIG. 8 illustrates the effect of the thermal conductivity of the spacer (Panel A) and length of the connector (panel B) on $G_{OFF}$, $G_{ON}$, and rectification (Panel C), and the rectification and heat gain (Panel D), according to some aspects of the present disclosure.
Figure 8:
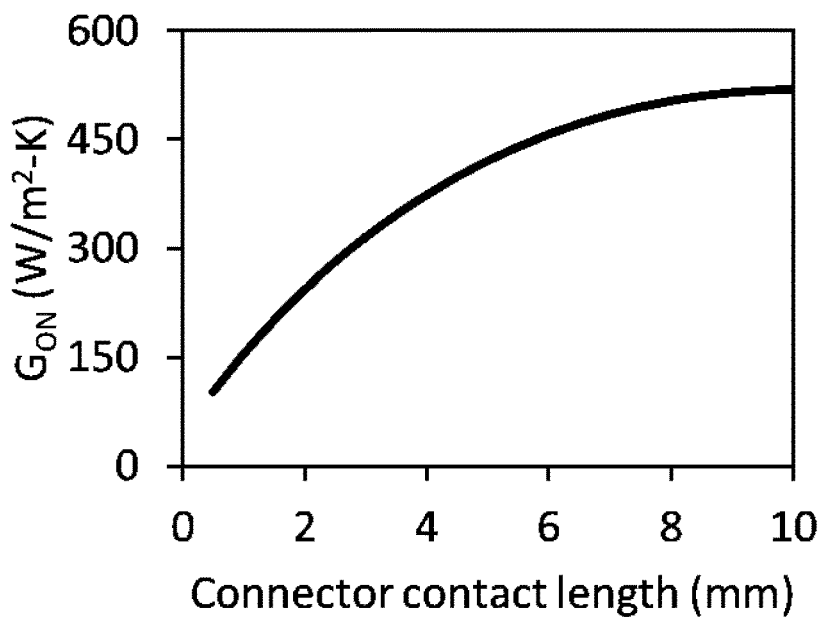
Figure 8:
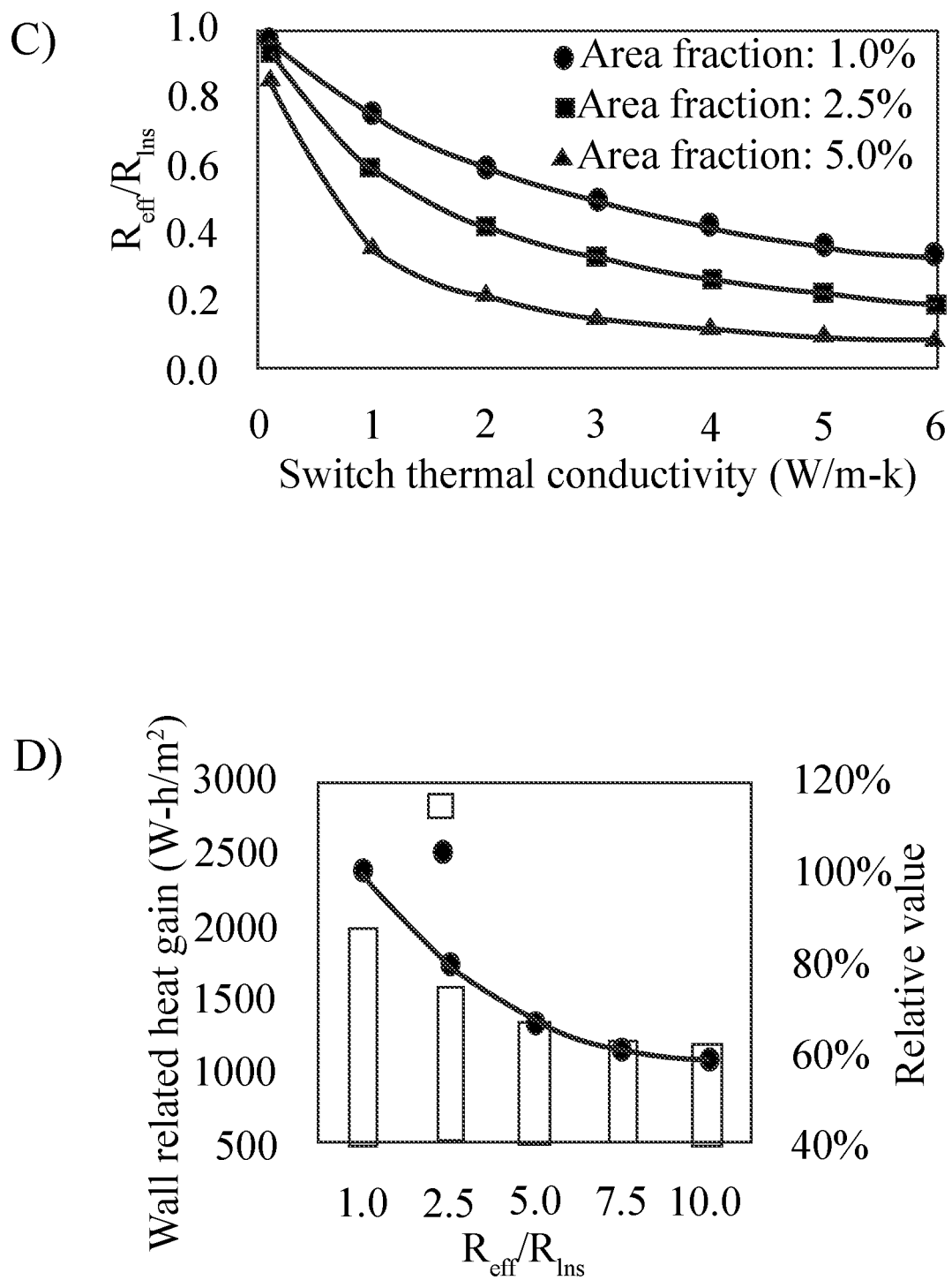

FIG. 8 illustrates the effect of the thermal conductivity of the spacer (Panel A) and length of the connector (Panel B) on $G_{OFF}$, $G_{ON}$, and rectification (Panel C), and the rectification and heat gain (Panel D), according to some aspects of the present disclosure. While the thermal conductivity of the insulator 210 has a significant effect on rectification (and $G_{OFF}$), the length of the connector 215 has negligible impact on the performance of the contact-based thermal switch 200.

The model developed to simulate the performance of the contact-based thermal switch 200 was expanded to perform a parametric study. While there are several parameters to consider, the focus was primarily on two parameters— thermal conductivity of the insulator 210, and length of the connector 215 (or the contact area between the conductors 205 and connector 215, in other words). The calculated values of $G_{OFF}$, $G_{ON}$, and rectification are plotted as contour plots as a function of these parameters and is shown in Panels A-C of FIG. 8. Based on this simulation, $G_{OFF}$ is a strong function of the thermal conductivity of the insulator 210 but neither $G_{OFF}$ nor $G_{ON}$ are strong functions of the length of the connector 215. Thus, the rectification is largely dictated by the thermal conductivity of the insulator 210. Upon further simulations, other parameters such as thermal conductivity of the conductor 205 and the connector 215 did not appear to have an impact on rectification that is comparable to that of thermal conductivity of insulator 210. This suggests that using a low conductivity insulation is critical to the performance of the contact-based thermal switch 200 design presented here.

To demonstrate a larger-scale viability of this contact-based thermal switch 200, consider a 1 m² by 1 m² panel. The walls of the panel are assumed to be approximately 1 cm thick and made of a metallized polymer layer (effective k=0.5 W/m-K). The separation between the outer walls is approximately 10 cm. As a baseline scenario, the space between the two walls was filled with polyurethane foam insulation (k of approximately 0.03 W/m-K). As an alternative, the case was considered where a small fraction of the area is uniformly comprised of the used in this study. The alternative scenario allows the panel to be passively switch between an insulating and conducting state depending on the state of the contact-based thermal switch 200. The performance of the self-regulating panel is measured using two metrics—(1) rectification ratio of the panel, $\gamma_{panel}$, which is the ratio of overall thermal conductance of the panel in the ON state to the OFF state, and (2) effectiveness, $\varepsilon$, which is the ratio of the conductance of the baseline panel to that of the self-regulating panel in the OFF state. For good performance of the self-regulating panel, a high value of $\gamma_{panel}$ and a value of $\varepsilon$ close to 1 is desired, as this implies an insulating behavior comparable to the baseline (pure insulation) while having the ability to switch to a highly conductive state. To simplify the analysis, it was assumed a 1-D heat transfer across the thickness of the panel and that conduction is the only mode of heat transfer. The experimental values of $G_{OFF}$ and $G_{ON}$ are used to model the contact-based thermal switch 200.

Since $\gamma_{panel}$ and ε follow opposite trends, $\eta=\varepsilon \cdot \gamma_{panel}$ was defined as a metric to measure the overall performance of the panel. By replacing just 0.5% of the polyurethane with contact-based thermal switch 200, it is possible to achieve a switching ratio of approximately 4.3, with an effectiveness of approximately 0.8. This amount of coverage corresponds to about 12 contact-based thermal switches 200 in the panel. Since ε and $\gamma_{panel}$ follow opposite trends, the metric η achieves a maximum (η=4.1) at approximately 1.3% coverage (corresponds to 26 regulators). At this area coverage, the switching ratio is approximately 6.9 with an effectiveness of approximately 0.6. With further optimization and demonstrations, such panels could be useful in buildings, and other applications that require temperature regulation and passive cooling. An optimal performance is achieved at an area fraction of approximately 0.03

In the present disclosure, a wax-motor driven contact-based thermal switch 200 was demonstrated experimentally, with a rectification ratio of approximately 17.5, which is roughly comparable to the highest performing thermal control devices on the market. The contact-based thermal switch 200 consists of two conductors 205 with an insulator 210 in between and a connector 215 that can slide inside. The thermal rectification is achieved depending on the location of the connector 215 relative to the conductors 205. The actuation in the demonstration is performed via a thermal wax motor 225. The contact-based thermal switch 200 also has the potential to work as a switch with slight modifications (e.g., an electrical linear motor instead of a thermal wax motor) which could improve its versatility. Furthermore, as seen from the results of the simulation, the performance of the contact-based thermal switch 200 can be significantly improved by using a different set of materials. The design also allows this contact-based thermal switch 200 to be implemented in a larger system, such as a dynamic panel, as shown in the FIG. 9.

Figure 9:
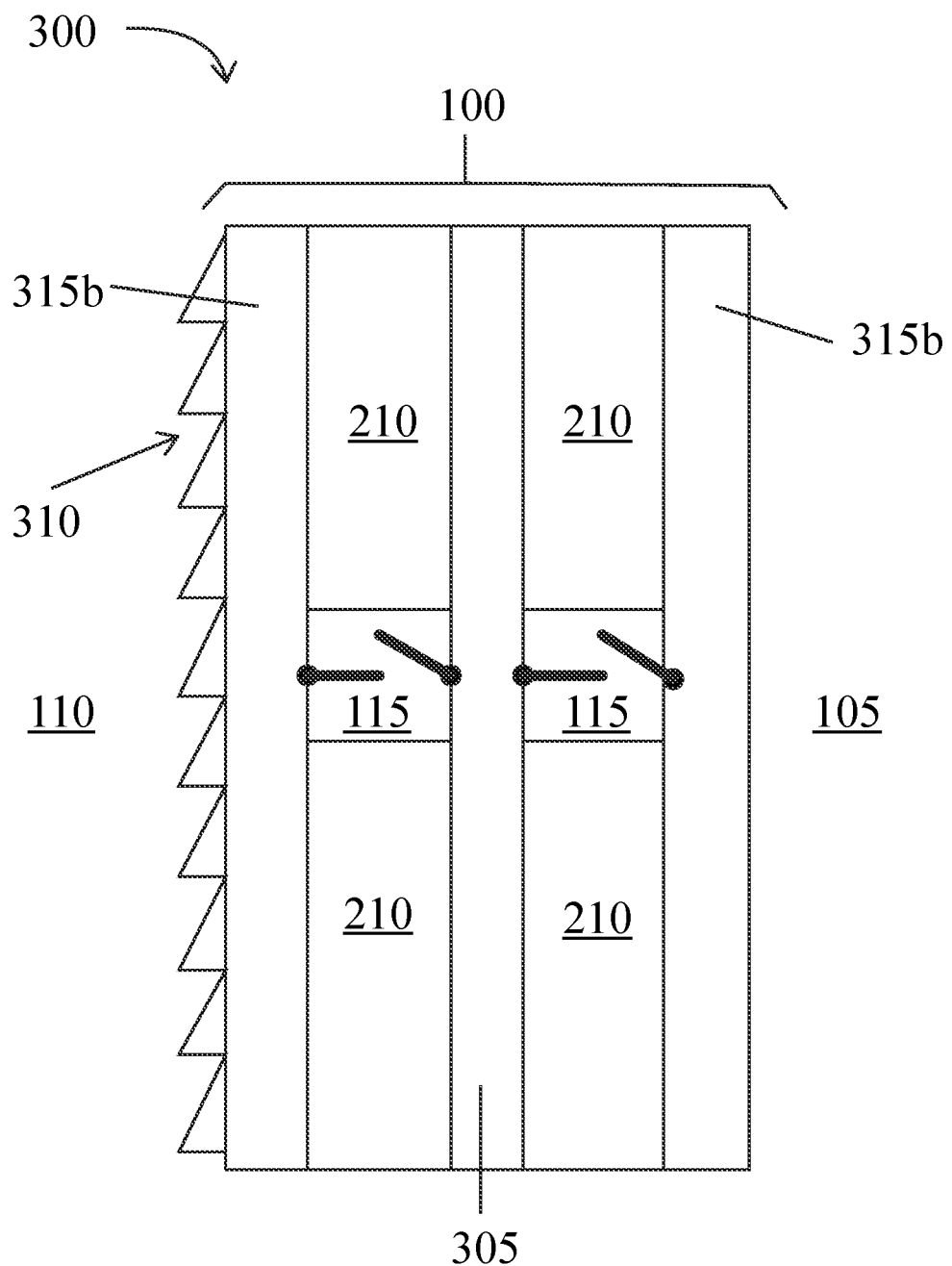
FIG. 9 illustrates how thermal control devices may act as a thermal bridge between insulation materials in a wall cavity of a building envelope, according to some aspects of the present disclosure.

In some embodiments, thermal control devices 115 may be used for thermal management and directional heat transfer in a building envelope. FIG. 9 illustrates a system 300 where a contact-based thermal switch 200 (or dual phase change thermal diodes 140) may act as a thermal bridge between insulation 210 materials in a wall cavity of a building envelope 100, according to some aspects of the present disclosure. By varying the thermal resistance and are fraction of the thermal control device 115, the effective R value of the insulation layer of the building envelope 100 can be changed, sometimes significantly (see Panel C of FIG. 8). Based on preliminary simulations, change in effective R value by about 5 to about 10 may enhance free natural cooling/heating, which may lead to up to about 30% to about 40% reduction in wall related heat gains.

FIG. 9 illustrates a wall cavity of a building envelope 100 containing wallboard 315 and insulation 210 and two thermal control devices 115 having variable conductivity. In this example, a phase change material (PCM) 305 may be integrated into the building envelope 100. The two thermal control devices 115 may default to the OFF configuration (i.e., the first position). However, when the ambient 110 and/or the building interior 105 (whichever is designated as the heat source 130) reaches a certain temperature, the thermal control devices 115 may be turned to the ON configuration (i.e., the second position). This may allow heat to transfer to and/or from a PCM 305 positioned within the building envelope. This could be used for improved building insulation 210 or thermal energy storage applications.

EXAMPLES

Example 1. A device for performing thermal management, the device comprising:
a positive temperature coefficient (PTC) switching material; and
a negative temperature coefficient (NTC) switching material; wherein:
the PTC switching material and NTC switching material are arranged in series,
the switching material is in direct thermal contact with a heat source,
the NTC switching material is in direct thermal contact with a heat sink, and
when the heat source is at a first temperature the device is configured to allow heat to flow from the heat source to the heat sink.

Example 2. The device of Example 1, wherein:
the first temperature is in the range of about 30° C. to about 50° C.

Example 3. The device of Example 2, wherein:
the first temperature is approximately 45° C.

Example 4. The device of any of Examples 1-3, wherein:
the PTC switching material comprises a material having a thermal resistance with a direct relationship to temperature.

Example 5. The device of any of Examples 1-4, wherein:
the PTC switching material comprises poly (N-isopropylacrylamide) (PNIPAM).

Example 6. The device of any of Examples 1-5, wherein:
the NTC switching material comprises a material having a thermal resistance with an inverse relationship to temperature.

Example 7. The device of any of Examples 1-6, wherein:
the NTC switching material comprises a salt hydrate.

Example 8. The device of Example 7, wherein:
the salt hydrate comprises at least one of calcium chloride hexahydrate ($CaCl_2 \cdot 6H_2O$) or calcium bromide hexahydrate ($CaBr_2 \cdot 6H_2O$).

Example 9. The device of Examples 7 or 8, wherein:
the salt hydrate comprises calcium chloride hexahydrate ($CaCl_2 \cdot 6H_2O$).

Example 10. The device of any of Examples 1-9, wherein:
the PTC switching material has a first transition temperature, and
the NTC switching material has a second transition temperature.

Example 11. The device of Example 10, wherein:
the first transition temperature and the second transition temperature are approximately equivalent.

Example 12. The device of Examples 10 or 11, wherein:
the first transition temperature is between about 30° C. and about 40° C.

Example 13. The device of Example 12, wherein:
the first transition temperature is approximately 32° C.

Example 14. The device of any of Examples 10-13, wherein:
the second transition temperature is between about 25° C. and about 45° C.

Example 15. The device of any of Examples 10-13, wherein:
the second transition temperature is approximately 29° C.

Example 16. The device of any of Examples 10-15, wherein:
the first temperature is greater than or approximately equivalent to the first transition temperature.

Example 17. The device of any of Examples 1-16, wherein:
at a second temperature the device is configured to not allow heat to flow from the heat source to the heat sink.

Example 18. The device of any of Examples 1-17, wherein:
the second temperature is less than the first transition temperature.

Example 19. The device of any of Examples 1-18, wherein:
the second temperature is less than the second transition temperature.

Example 20. The device of any of Examples 1-19, wherein:
the device has a thermal rectification of greater than about 2.0.

Example 21. The device of any of Examples 1-20, wherein:
the device has a thermal rectification of about 2.5.

Example 22. The device of any of Examples 1-21, wherein:
the heat source comprises an ambient, and
the heat sink comprises a building interior.

Example 23. The device of any of Examples 1-22, wherein:
the heat source comprises a building interior, and
the heat sink comprises an ambient.

Example 24. A device for performing thermal management, the device comprising:
a first conductor in direct thermal contact with a heat source;
a second conductor in direct thermal contact with a heat sink;
an insulator positioned between the first conductor and the second conductor and having a length;
a connector extending greater than the length; and
a piston configured to move the connector; wherein;
the connector is configured to move between a first position and a second position,
the first position comprises the connector being in thermal contact with the first conductor,
the second position comprises the connector being in thermal contact with the first conductor and the second conductor, and
at a first temperature the piston is configured to move the connector from the first position to the second position, and
when in the second position the device is configured to allow heat to flow from the heat source to the heat sink.

Example 25. The device of Example 24, wherein:
the first conductor comprises a conductive material.

Example 26. The device of Examples 24 or 25, wherein:
the second conductor comprises a conductive material.

Example 27. The device of Example 26, wherein:
the conductive material comprises at least one of aluminum, copper, gold, or silver.

Example 28. The device of any of Examples 24-27, wherein:
the insulator comprises an insulative material.

Example 29. The device of Example 28, wherein:
the insulative material comprises at least one of acrylic, fiberglass, plastic, foam, or concrete.

Example 30. The device of any of Examples 24-29, wherein:
the first temperature is in the range of about 30° C. to about 50° C.

Example 31. The device of Example 30, wherein:
the first temperature is approximately 45° C.

Example 32. The device of any of Examples 24-31, wherein:
the connector comprises a conductive material.

Example 33. The device of Example 32, wherein:
the conductive material comprises at least one of aluminum, copper, gold, or silver.

Example 34. The device of any of Examples 24-33, further comprising:
a motor configured to power the piston.

Example 35. The device of Example 34, wherein:
the motor comprises a wax,
the wax is configured to melt at approximately the first temperate temperature, and
the wax is configured to expand when melted, thereby moving the piston to the second position.

Example 36. The device of Example 35, wherein:
the wax is configured to solidify at approximately a second temperature, and
the wax is configured to compress when it solidifies, thereby moving the piston to the first position.

Example 37. The device of Examples 35 or 36, wherein:
the wax comprises a paraffin wax.

Example 38. The device of any of Examples 36-37, wherein:
the wax comprises a phase change material.

Example 39. The device of Example 34, wherein:
the motor comprises an electromagnetic motor.

Example 40. The device of any of Examples 24-39, wherein:
the first conductor and the second conductor are concentrically aligned, and
the connector is concentrically aligned with the first conductor and the second conductor.

Example 41. The device of any of Examples 24-40, wherein:
the connector is concentrically aligned with the insulator.

Example 42. The device of any of Examples 24-41, wherein:
the connector is configured to slide inside at least a part of the first conductor, the second conductor, and the insulator.

Example 43. The device of any of Examples 24-42, wherein:
the heat source comprises an ambient, and
the heat sink comprises a building interior.

Example 44. The device of any of Examples 24-43, wherein:
the heat source comprises a building interior, and
the heat sink comprises an ambient.

Example 45. The device of any of Examples 24-44, wherein:
at a second temperature the device is configured to move from the second position to the first position.

Example 46. The device of Examples 24-45, wherein:
the second temperature is less than about 30° C.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods, and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges, and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device for performing thermal management, the device comprising:
   a positive temperature coefficient (PTC) switching material having a first transition temperature; and
   a negative temperature coefficient (NTC) switching material; wherein:
   the PTC switching material and NTC switching material are arranged in series,
   the PTC switching material is in direct thermal contact with a heat source,
   the NTC switching material is in direct thermal contact with a heat sink, when the heat source is at a first temperature greater than the first transition temperature the PTC switching material is substantially thermally conductive, and when the heat source is at the first temperature the device allows heat to flow from the heat source to the heat sink.

2. The device of claim 1, wherein:
the first temperature is in the range of about 30° C. to about 50° C.

3. The device of claim 1, wherein:
the PTC switching material comprises poly (N-isopropylacrylamide) (PNIPAM).

4. The device of claim 1, wherein:
the NTC switching material comprises calcium chloride hexahydrate ($CaCl_2 \cdot 6H_2O$).

5. The device of claim 1, wherein:
the NTC switching material has a second transition temperature.

6. The device of claim 1, wherein:
the first transition temperature is between about 30° C. and about 40° C.

7. The device of claim 5, wherein:
at a second temperature the NTC switching material is not substantially conductive and the device does not allow heat to flow from the heat source to the heat sink.

8. The device of claim 7, wherein:
the second temperature is less than the first transition temperature.

9. The device of claim 1, wherein:
the device has a thermal rectification of greater than about 2.0.

* * * * *